US009420286B2

(12) United States Patent
Chen et al.

(10) Patent No.: US 9,420,286 B2
(45) Date of Patent: Aug. 16, 2016

(54) TEMPORAL MOTION VECTOR PREDICTION IN HEVC AND ITS EXTENSIONS

(71) Applicant: QUALCOMM Incorporated, San Diego, CA (US)

(72) Inventors: Ying Chen, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 13/917,538

(22) Filed: Jun. 13, 2013

(65) Prior Publication Data

US 2013/0336407 A1    Dec. 19, 2013

Related U.S. Application Data

(60) Provisional application No. 61/660,625, filed on Jun. 15, 2012, provisional application No. 61/749,223, filed on Jan. 4, 2013.

(51) Int. Cl.

| H04N 7/34 | (2006.01) |
| H04N 19/593 | (2014.01) |
| H04N 19/597 | (2014.01) |
| H04N 19/513 | (2014.01) |
| H04N 19/58 | (2014.01) |

(52) U.S. Cl.
CPC ....... *H04N 19/00763* (2013.01); *H04N 19/513* (2014.11); *H04N 19/58* (2014.11); *H04N 19/593* (2014.11); *H04N 19/597* (2014.11)

(58) Field of Classification Search
None
See application file for complete search history.

(56) References Cited

U.S. PATENT DOCUMENTS

| 2008/0089416 A1 | 4/2008 | Jeon |
| 2010/0220785 A1* | 9/2010 | Alfonso ............. H04N 19/0003 375/240.13 |
| 2012/0236942 A1 | 9/2012 | Lin et al. |
| 2013/0077677 A1 | 3/2013 | Wang et al. |

(Continued)

FOREIGN PATENT DOCUMENTS

| WO | 2013069231 A1 | 5/2013 |
| WO | 2013109953 | 7/2013 |

OTHER PUBLICATIONS

International Preliminary Report on Patentability from corresponding PCT Application Serial No. PCT/US2013/045922 dated Oct. 6, 2014 (26 pages).

(Continued)

*Primary Examiner* — Frederick Bailey
(74) *Attorney, Agent, or Firm* — Shumaker & Sieffert, P.A.

(57) ABSTRACT

In one example, a device includes a video coder configured to determine, for each reference picture in one or more reference picture lists for a current picture, whether the reference picture is to be included in a plurality of reference pictures based on types for the reference pictures in the reference picture lists, compare picture order count (POC) values of each of the plurality of reference pictures to a POC value of the current picture to determine a motion vector predictor for a current block based on motion vectors of a co-located block of video data in a reference picture of the plurality of reference pictures, determine whether a forward motion vector or a backward motion vector of the co-located block is to be initially used to derive the motion vector predictor, and code a motion vector for the current block of video data relative to the motion vector predictor.

48 Claims, 7 Drawing Sheets

(56) References Cited

U.S. PATENT DOCUMENTS

| | | |
|---|---|---|
| 2013/0089134 A1 | 4/2013 | Wang et al. |
| 2013/0107962 A1 | 5/2013 | Sim et al. |
| 2013/0107965 A1 | 5/2013 | Wahadaniah et al. |
| 2013/0114742 A1 | 5/2013 | Hannuksela et al. |
| 2013/0243093 A1 | 9/2013 | Chen et al. |
| 2014/0092967 A1 | 4/2014 | Seregin et al. |

OTHER PUBLICATIONS

Boyce et al., "Information for HEVC scalability extension," JCT-VC Meeting; MPEG Meeting; Geneva; (Joint Collaborative Team on Video Coding of ISO/IEC JTC1/SC29/WG11 and ITU-T SG.16); URL: http://wftp3.itu.int/av-arch/jctvc-site/ No. JCTVC-G078, Nov. 21-30, 2011, 7 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May, 7 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "WD5: Working Draft 5 of High-Efficiency Video Coding, " JCT-VC Meeting; MPEG Meeting; Geneva; (Joint Collaborative Team on Video Coding of ISO/IEC JTC1/SC29/WG11 and ITU-T SG.16 ), No. JCTVC-G1103_d0, Nov. 21-30, 2011, 213 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen et al., "Description of scalable video coding technology proposal by Qualcomm (configuration 1)," JCT-VC Meeting; MPEG Meeting; Shanghai; (Joint Collaborative Team on Video Coding of ISO/IEC JTC1/SC29/WG11 and ITU-T SG.16); URL:http://wftp3.itu.int/av-arch/jctvc-site/, No. JCTVC-K0035, Oct. 10-19, 2012, 19 pp.

Chen et al., "AHG10: Motion related hooks for HEVC multiview/3DV extension based on long-term reference pictures," JCT-VC Meeting; MPEG Meeting; Stockholm; (Joint Collaborative Team on Video Coding of ISO/IEC JTC1/SC29/WG11 and ITU-T SG.16 ), No. JCTVC-J0121, Jul. 11-20, 2012, 8 pp.

Chiu et al., "TE C5: Crosscheck for 5.2.7 on EL AMVP mode (JCTVC-L0164)," JCTVC-L0310, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 2 pp.

Francois, "Cross-check of TE5 proposal JCTVC-L0205 on Using base layer MV in Merge and AMVP modes," JCTVC-L0432, Joint Collaborative Team on Video Coding (JCT-VC) of ITU-T SG 16 WP 3 and ISO/IEC JTC 1/SC 29/ WG 11, 12th Meeting: Geneva, CH, Jan. 14-23, 2013, 1 pp.

Hannuksela et al., "AHG21: Removal of reference picture list modification," MPEG Meeting; San Josa CR; (Motion Picture Expert Group or Iso/Iec JTC1/SC29/WG11), No. m23302, Feb. 1-10, 2012, 10 pp.

Hong et al., "Scalability Support in HEVC," Joint Collaborative Team on Video Coding (JCT-VC) of ITU-T SG16 WP3 and ISO/IEC JTC1/SC29/WG11, 6th Meeting: Torino, IT, Document: JCTVC-F290, Jul. 14-22, 2011, 15 pp.

International Search Report and Written Opinion—PCT/US2013/045922, International Search Authority—European Patent Office, Sep. 17, 2013, 12 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Schwarz et al., "Test Model under Consideration for HEVC based 3D video coding v3.0," MPEG Meeting; Geneva; (Motion Picture Expert Group or ISO/IEC JTC1/SC29/WG11), No. N12744, Apr. 2012, 46 pp.

Seregin et al., "TE5: Using base layer MV in Merge and AMVP modes (test 5.2.2)," JCTVC-L0205, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, 3 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Wiegand et al., "WD1: Working Draft 1 of High-Efficiency Video Coding", JCTVC-C403, 3rd Meeting: Guangzhou, CN, Oct. 7-15, 2010, 137 pp.

ITU-T H.264, Series H: Audiovisual and Multimedia Systems, Infrastructure of audiovisual services—Coding of moving video, Advanced video coding for generic audiovisual services, Mar. 2005, 343 pp.

ITU-T H.264, Series H: Audiovisual and Multimedia Systems, Infrastructure of audiovisual services—Coding of moving video, Advanced video coding for generic audiovisual services, Mar. 2010, 674 pp.

ITU-T H.265, Series H: Audiovisual and Multimedia Systems, Infrastructure of audiovisual services—Coding of moving video, High efficiency video coding, The International Telecommunication Union, Apr. 2013, 317 pp.

Second Written Opinion of international application No. PCT/US2013/045922, mailed Jul. 4, 2014, 8 pp.

Reply to Written Opinion mailed Sep. 17, 2013, from international application No. PCT/US2013/045922, dated Apr. 15, 2014, 34 pp.

Reply to Second Written Opinion mailed Jul. 4, 2014, from international application No. PCT/US2013/045922, dated Sep. 2, 2014, 29 pp.

Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, CH, Document No. JCTVC-G1103_d4, Nov. 21-30, 2011, 219 pp.

Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, Document No. JCTVC-K1003_v13, Oct. 10-19, 2012, 317 pp.

\* cited by examiner

TEMPORAL MOTION VECTOR PREDICTION IN HEVC AND ITS EXTENSIONS This application claims the benefit of the following U.S. provisional patent applications, the entire contents of each of which are hereby incorporated by reference:
U.S. Provisional Application Ser. No. 61/660,625, filed on Jun. 15, 2012;
U.S. Provisional Application Ser. No. 61/749,223, filed on Jan. 4, 2013.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards, such as Scalable Video Coding (SVC) and Multiview Video Coding (MVC). Version 6 of the Working Draft (WD) of HEVC is available from http://phenix.int-evey.fr/jct/doc_end_user/documents/8_San %20Jose/wg11/JCTVC-H1003-v21.zip. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques for coding motion vectors, including determining a temporal motion vector predictor (TMVP) for coding motion vectors. The techniques of this disclosure may be applicable to High Efficiency Video Coding (HEVC) and its extensions, such as multiview or three-dimensional video (3DV) extensions. For example, the techniques of this disclosure may promote coding efficiency gains when determining a TMVP using a so-called "low delay choice" selection criteria, e.g., by comparing the POC values of the pictures in both reference picture list 0 (RefPicList0) and reference picture list 1 (RefPicList1) with the POC of the current picture, of which motion vector (e.g., from possible two, corresponding to either RefPicList0 or RefPicList1) of the co-located block to be checked first for the derivation of the TMVP candidate for the current block.

If the "low delay choice" is true, the motion vector associated with RefPicListX (with X being equal to either 0 or 1) may firstly be used to derive the motion vector candidate associated with RefPicListX, otherwise, the motion vector associated with the reference picture list signaled in slice header may be used. In both cases, if the first checked motion vector is unavailable, the second motion vector of the co-located block, if available, may be used.

In one example, a method of decoding video data includes determining, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, comparing picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determining whether a forward motion vector or a backward motion vector of the co-located block is to be initially used to derive the motion vector predictor, deriving the motion vector predictor based at least in part on the determination, and decoding a motion vector for the current block of video data relative to the motion vector predictor.

In another example, a method of encoding video data includes determining, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, comparing picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determining whether a forward motion vector or a backward motion vector of the co-located block is to be initially used to derive the motion vector predictor, deriving the motion vector predictor based at least in part on the determination, and encoding a motion vector for the current block of video data relative to the motion vector predictor.

In another example, a device for coding video data includes a video coder configured to determine, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, compare picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determine whether a forward motion vector or a backward motion vector of the co-located block is to be initially used to derive the motion vector predictor, derive the motion vector predictor based at least in part on the determination, and code a motion vector for the current block of video data relative to the motion vector predictor.

In another example, a device for coding video data includes means for determining, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, means for comparing picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, means for determining whether a forward motion vector or a backward motion vector of the co-located block is to be initially used to derive the motion vector predictor, means for deriving the motion vector predictor based at least in part on the determination, and means for coding a motion vector for the current block of video data relative to the motion vector predictor.

In another example, a computer-readable storage medium has stored thereon instructions that, when executed, cause a processor of a device for coding video data to determine, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, compare picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determine whether a forward motion vector or a backward motion vector of the co-located block is to be initially used to derive the motion vector predictor, derive the motion vector predictor based at least in part on the determination, and decode a motion vector for the current block of video data relative to the motion vector predictor.

The details of one or more examples are set forth in the accompanying drawings and the description below. Other features, objects, and advantages will be apparent from the description and drawings, and from the claims.

DETAILED DESCRIPTION

Figure 1:
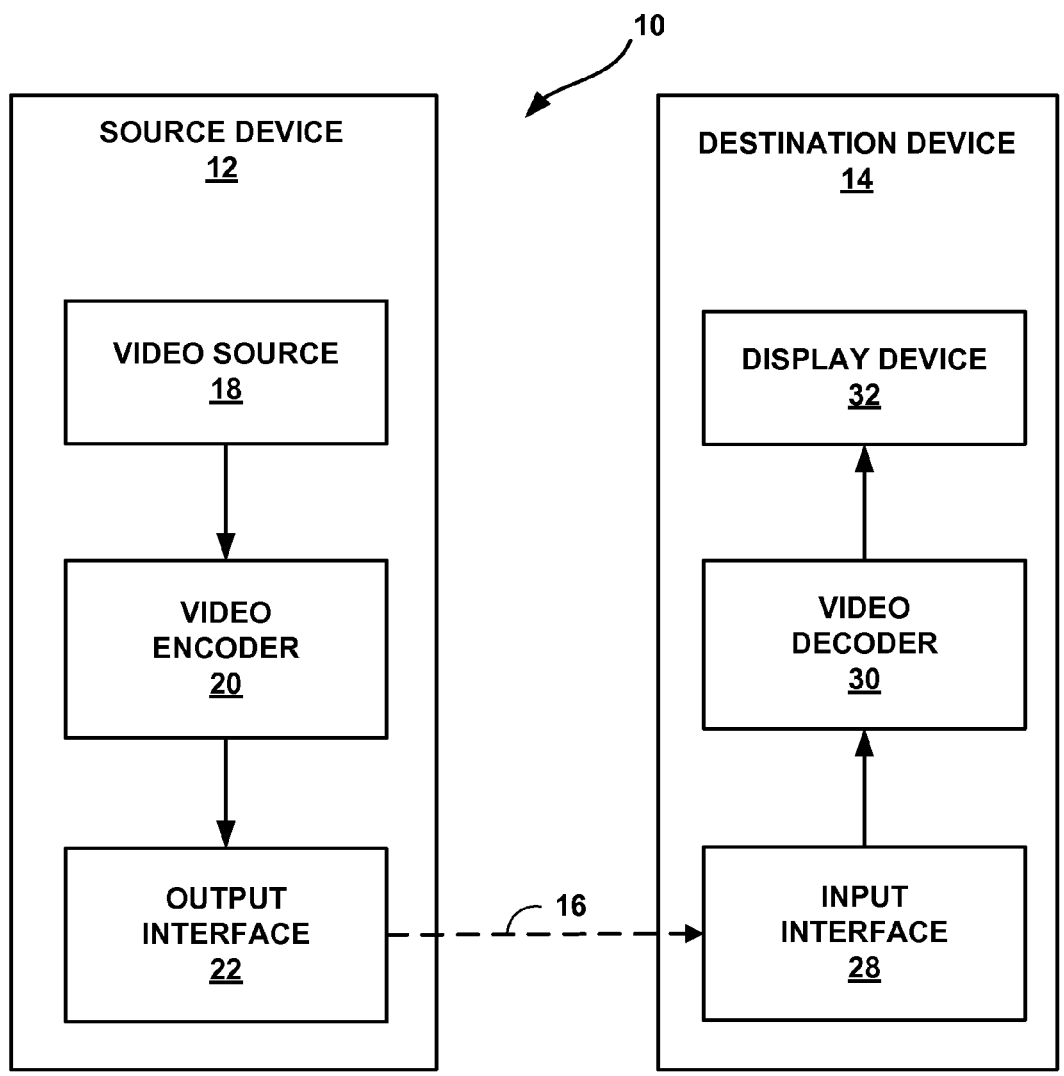
FIG. 1 is a block diagram illustrating an example video encoding and decoding system that may utilize techniques for determining a temporal motion vector predictor (TMVP).

In general, this disclosure describes techniques for coding multiview video coding (MVC) data. Currently, the Motion Pictures Experts Group (MPEG) is developing a three-dimensional video (3DV) standard based on the upcoming high efficiency video coding (HEVC) standard. Part of the standardization efforts also includes the standardization of the scalable video codec based on HEVC and/or the multiview video codec based on HEVC.

In two-dimensional video coding, video data (that is, a sequence of pictures) is coded picture by picture, not necessarily in display order. Video coding devices divide each picture into blocks, and code each block individually. Block-based prediction modes include spatial prediction, also referred to as intra-prediction, and temporal prediction, also referred to as inter-prediction.

For three-dimensional video data, such as HEVC based 3DV, blocks may also be inter-view predicted. That is, blocks may be predicted from a picture of another view, where each view generally corresponds to a respective camera location. In this manner, in HEVC based 3DV, inter-view prediction based on reconstructed view components from different views may be enabled. This disclosure uses the term "view component" to refer to an encoded picture of a particular view. That is, a view component may comprise an encoded picture for a particular view at a particular time (in terms of display order, or output order). A view component (or slices of a view component) may have a picture order count (POC) value, which generally indicates the display order (or output order) of the view component.

In temporal inter-prediction or inter-view prediction, a video coding device may code data indicative of one or more temporal motion vectors (temporal inter-prediction) and/or one or more disparity motion vectors (inter-view prediction). In some examples, a block coded with one temporal or disparity motion vector is referred to as a P-block, whereas a block coded with two motion vectors or two displacement vectors is referred to as a bi-predictive block, or B-block. Techniques that are applicable to motion vectors are also generally applicable to displacement vectors, and therefore, this disclosure primarily describes motion vector coding techniques. However, it should be understood that such techniques are also applicable to disparity motion vectors, and likewise, that techniques described with respect to disparity motion vectors are also applicable to temporal motion vectors, unless otherwise indicated.

Generally, data indicative of reference pictures, to which a motion vector or displacement vector may refer, are stored in reference picture lists. Thus, motion vector data (temporal or disparity motion vector data) may include not only data for an x-component and a y-component of the motion vector, but also an indication of an entry of the reference picture list, referred to as a reference picture index. Video coding devices may construct multiple reference picture lists. For example, a video coding device may construct a first reference picture list (list 0 or RefPicList0) to store data for reference pictures having POC values earlier than a current picture, and a second reference picture list (list 1 or RefPicList1) to store data for reference pictures having POC values later than a current picture. Again, it is noted that display or output orders for pictures are not necessarily the same as coding order values (e.g., frame number or "frame_num" values). Thus, pictures may be coded in an order that differs from the order in which the frames are displayed (or captured).

Typically, a reference picture list construction for the first or the second reference picture list of a B picture includes two steps: reference picture list initialization and reference picture list reordering (modification). The reference picture list initialization is an explicit mechanism that puts the reference pictures in the reference picture memory (also known as decoded picture buffer) into a list based on the order of POC (Picture Order Count, aligned with display order of a picture) values. The reference picture list reordering mechanism can modify the position of a picture that was put in the list during the reference picture list initialization to any new position, or put any reference picture in the reference picture memory in any position even the picture doesn't belong to the initialized list. Some pictures after the reference picture list reordering (modification) may be put in a further position in the list. However, if a position of a picture exceeds the number of active reference pictures of the list, the picture is not considered as an entry of the final reference picture list. The number of active reference pictures of maybe signaled in a slice header for each list. After reference picture lists are constructed (e.g., RefPicList0 and RefPicList1, if available), a reference index can be used to identify a picture in any reference picture list.

As noted above, motion vector data may also include a horizontal component (or x-component) and a vertical component (or y-component). Thus, a motion vector may be defined as <x, y>. Rather than coding the x-component and y-component of a motion vector directly, video coding devices may code motion vectors relative to motion vector predictors. Motion vector predictors may be selected from spatial neighbors for a current block, a collocated block of a temporally separate picture (e.g., a collocated block in a previously coded picture), or a corresponding block of a picture in another view at the same temporal instance, in various examples. Motion vector predictors of a temporally separate picture are referred to as temporal motion vector predictors (TMVPs).

To determine a TMVP for a current block (e.g., a current prediction unit (PU) of a current coding unit (CU) in HEVC), a video coding device may first identify a co-located picture. The term "co-located" picture refers to a picture including a particular co-located block. The co-located block may also be included in a "co-located partition," as indicated in WD6 of HEVC. If the current picture is a B slice, a collocated_from_l0_flag may be signaled in a slice header of a slice of the current picture to indicate whether the co-located picture is from RefPicList0 or RefPicList1. After a reference picture list is identified, the video coding device may use collocated_ref_idx, signaled in the slice header, to identify the co-located picture in the reference picture list. A co-located PU is then identified by checking the co-located picture. Either the motion vector of the right-bottom PU of the CU containing the current PU, or the motion vector of the right-bottom PU within the center PUs of the CU containing this PU, may be treated as the TMVP for the current PU. When motion vectors identified by the above process are used to generate a motion candidate for AMVP or merge mode, they may be scaled based on the temporal location (reflected by POC value of the reference picture).

In HEVC, the picture parameter set (PPS) includes a flag enable_temporal_mvp_flag. When a particular picture with temporal_id_equal to 0 refers to a PPS having enable_temporal_mvp_flag equal to 0, all the reference pictures in the DPB may be marked as "unused for temporal motion vector prediction," and no motion vector from pictures before that particular picture in decoding order would be used as a temporal motion vector predictor in decoding of the particular picture or a picture after the particular picture in decoding order.

When deriving a TMVP for a uni-directional inter-predicted block, the reference picture list corresponding to the direction of the motion vector for the block being coded is used for TMVP derivation. That is, if the motion vector for the current block points to a reference picture in list 0, the TMVP may be derived using a co-located block in list 0. If the motion vector for the current block points to a reference picture in list 1, the TMVP may be derived using a co-located block in list 1.

When deriving one or more TMVPs for a bi-directional inter-predicted block, all reference picture POC values may be compared to the POC value of the current frame. The determination of the TMVPs may then be determined based on a so-called "low delay choice" condition. For example, low delay choice refers to a condition in which all reference picture POC values from both reference lists are smaller than or equal to the POC value of the picture containing the current block. Thus, all of the reference pictures occur earlier in display order than the current picture. A reference picture list direction is considered as either forward direction or backward direction depending on whether the reference picture list is RefPicList0 or RefPicList1. A motion vector direction is considered as either forward or backward direction depending on whether it is associated with a RefPicList0 or RefPicList1 respectively. A motion vector with a forward/backward direction is named a forward/backward motion vector. Typically, TMVP derivation proceeds as follows:

Low delay choice: if a low delay condition is true, the corresponding lists RefPicList0 and RefPicList1 are used to derive a potentially bi-directional TMVP. That is, a TMVP may be derived for the motion vector pointing to a reference picture in RefPicList0 using a motion vector of the co-located block that points to a reference picture in RefPicList0. In addition, a TMVP may be derived for the motion vector pointing to a reference picture in RefPicList1 using a motion vector of the co-located block that points to a reference picture in RefPicList1.

Not low delay choice: if the low delay condition is not true, a potentially bi-directional TMVP is derived from the reference list specified by the collocated_from_l0_flag. That is, a TMVP may be derived using a motion vector of the co-located block that points to the same reference picture list as indicated by the collocated_from_l0_flag.

Using the low delay choice may lead to coding efficiency gain. In some examples, that motion vector may be scaled to provide a second TMVP.

HEVC distinguishes long-term from short-term reference pictures. In the techniques of HEVC, long-term pictures are stored in a decoded picture buffer (DPB) relatively longer than short-term reference pictures. Additionally, syntax elements are used to indicate whether a reference picture is a long-term or a short-term reference picture. In some examples, in MVC and 3DV, long-term reference pictures may instead correspond to temporal reference pictures (i.e., of the same layer or view as a current picture being coded) while short-term reference pictures may instead correspond to inter-view reference pictures (i.e., of a different layer or view as the current picture being coded). Thus, the use of long-term and short-term reference pictures can also provide an indication of whether a reference picture is a temporal reference picture or an inter-view reference picture. Likewise, a motion vector referring to a long-term reference picture may comprise a temporal motion vector, whereas a motion vector referring to a short-term reference picture may comprise a disparity motion vector.

U.S. patent application Ser. No. 13/801,350 filed Mar. 13, 2013 and assigned to Qualcomm Incorporated, proposed that a disparity motion vector should not be used to predict a temporal motion vector and a temporal motion vector should not be used to predict a disparity motion vector. Thus, when checking the POC values of each reference picture during TMVP to determine if a motion vector is used for prediction, only reference pictures with RefPicTypeFunc( ) equal to 0 are checked, where RefPicTypeFunc( ) returns a zero for a short-term reference picture (POC values are only compared to the POC value of the current picture for short-term reference pictures).

Thus, while certain techniques may be used to check the POC values of short-term reference pictures for determining a TMVP, in some instances, every reference picture in the reference picture lists may be a long-term reference picture. In addition, when both short-term and long-term pictures are present in reference picture lists, selecting the motion vector from the co-located picture that points to a short-term reference picture may be more efficient for TMVP. In addition, when a long-term reference is involved, it may be more efficient to select the reference picture defined in slice header by collocated_from_l0_flag and collocated_ref_idx for the TMVP.

The techniques of this disclosure may include refinements to the process of determining a TMVP in order to address the issues above. For example, rather than determining a POC value of each reference picture of reference picture lists (list 0 and list 1) and comparing the POC values to the POC value of the current picture to resolve the low delay choice condition described above (when selecting a reference picture for a TMVP), the short-term and/or long-term markings of reference pictures may be used. That is, according to aspects of this disclosure, when determining reference pictures for one or more TMVPs using a low delay choice condition, the reference pictures may be determined based on whether the reference picture lists contain short-term or long-term pictures.

In an example, according to aspects of this disclosure, when a current picture being coded does not contain any temporal short-term reference pictures (that is, all of the reference pictures are long term reference pictures), a TMVP may be determined using the "not low delay choice" condition described above. That is, a potentially bi-directional TMVP may be derived from the reference list specified by the collocated_from_l0_flag. In this case, the TMVP may be derived using a motion vector of the co-located block that points to the same reference picture list as indicated by the collocated_from_l0_flag. In some examples, that motion vector may be scaled to provide a second TMVP.

In the example described above, the TMVP determination may be performed without comparing the POC value of the current picture to the POC value of each reference picture in the reference pictures lists, which may provide an efficiency gain when determining a TMVP. For example, the selection of the reference picture for the TMVP may be determined without determining and comparing POC values for all pictures, because inter-view and inter-layer pictures are marked as long-term reference picture and therefore have the same POC value as the current picture, i.e., the low delay condition is false.

In another example, when a current picture being coded does not contain any temporal short-term reference pictures (that is, when all of the reference pictures are long term reference pictures), a TMVP may be determined using the "low delay choice" condition described above. For instance, rather than comparing POC values for the reference pictures in the reference picture list to the POC value of the current picture, a video coder may determine that, because all of the reference pictures are long-term reference pictures, all of the reference pictures have POC values equal to the current picture, thereby avoiding the computationally expensive comparisons of POC values. In this case, TMVPs may be derived from the corresponding direction of the co-located picture. For example, a TMVP may be derived for a motion vector pointing to a reference picture in RefPicList0 using a motion vector of the co-located block that points to a reference picture in RefPicList0. A TMVP may be derived for a motion vector pointing to a reference picture in RefPicList1 using a motion vector of the co-located block that points to a reference picture in RefPicList1.

Again, in this example, the TMVP determination may be performed without comparing the POC value of the current picture to the POC value of each reference picture in the reference pictures lists, which may provide an efficiency gain when determining a TMVP.

In an alternative example, when at least one reference picture is not a temporal short-term reference picture (at least one long-term reference picture is included in the reference picture lists), a TMVP may be determined using the "not low delay choice" condition described above. In this case, a potentially bi-directional TMVP may derived according to the pre-defined direction dictated by the slice header, i.e., from the reference list specified by the collocated_from_l0_flag.

According to another aspect of this disclosure, a constraint may be added that specifies that collocated_ref_idx corresponds to the same short-term reference picture for slices of the same picture. In another example, a constraint may be added that specifies that collocated_ref_idx corresponds to the same long-term reference picture for slices of the same picture. In another example, a constraint may be added that specifies that collocated_ref_idx corresponds to the same inter-view/inter-layer reference picture for slices of the same picture. Such constraints may further improve efficiency by maintaining the same co-located reference picture for an entire slice.

Other aspects of this disclosure relate to marking reference pictures as short-term reference pictures or long-term reference pictures. For example, in the HEVC base specification, during TMVP derivation, if a TMVP target picture (the picture containing the block having the motion vector that is being predicted) and a co-located picture (the picture containing the co-located block from which the TMVP is derived) are both in the base view/layer picture (e.g., collocated_ref_idx is equal to 0), the TMVP candidate is only available if the motion vector points to a long-term reference picture.

However, this long-term reference picture condition may result in an unreliable motion vector being used for TMVP. For example, a temporal motion vector (pointing to a temporal long-term reference) may be used to generate a TMVP candidate for an inter-view/layer motion vector (pointing to an inter-view/layer reference picture). Such a TMVP candidate may be relatively large; however, the inter-view/layer motion vector being predicted should be relatively small.

Aspects of this disclosure address the issue identified above. For AMVP, the issue described above may not lead to a large efficiency loss, because another reference index can be signaled for a motion vector predictor candidate and the inaccurate TMVP will likely not be chosen for coding.

However, in HEVC the reference index of the TMVP candidate for merge mode is fixed to reference index zero. Thus, the TMVP target picture is fixed to the reference picture having a reference picture index of zero. In this merge mode scenario, the techniques of this disclosure may be used to disable TMVP. In one example, TMVP may be disabled by signaling slice_temporal_mvp_enable_flag equal to zero. However, such an approach may also disable the ability to use a TMVP in AMVP, which may lead to performance degradation.

In another example, according to aspects of this disclosure, two control flags may be introduced for TMVP. The control flags may be included in a slice header of an HEVC extension. In this example, one control flag may indicate the availability of a TMVP for merge mode, and one control flag may indicate the availability of a TMVP for AMVP. In an example, the syntax elements may include the following: slice_merge_temporal_mvp_enable_flag and slice_amvp_temporal_mvp_enable_flag, which may replace the slice_temporal_mvp_enable_flag currently included in HEVC. In this example, slice_merge_temporal_mvp_enable_flag may be set equal to 0, while slice_amvp_temporal_mvp_enable_flag is not necessarily equal to 0. The separate TMVP control flags for merge mode and AMVP may also be useful for other scenarios.

In still another example, according to aspects of this disclosure, the co-located reference picture may be marked as a short-term reference picture only if the co-located picture (identified by collocated_ref_idx in HEVC) is equal to the TMVP target reference picture (indicated by reference index equal to zero in HEVC) and the co-located picture has the same layer_id (or view_id) as the current slice of the current picture. This example represents a departure from the typical short-term and long-term reference picture marking scheme. The reference picture marking described above may be performed, for example, after parsing a slice header and before decoding (e.g., performing motion compensation) of a block in the slice.

FIG. 1 is a block diagram illustrating an example video encoding and decoding system 10 that may utilize techniques for determining a TMVP. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for determining a TMVP. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining a TMVP may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Likewise, video encoder 20 and video decoder 30 may be configured according to an extension of the HEVC standard, e.g., a multiview extension or three-dimensional video (3DV) extension. Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder 20 may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Video encoder 20 and video decoder 30 may be configured to perform one or more of the various techniques of this disclosure, alone or in any combination. For example, in accordance with certain techniques of this disclosure, video encoder 20 and video decoder 30 may be configured to perform various techniques related to multiview video coding (MVC) or three-dimensional video (3DV) coding, e.g., as extensions of H.264/AVC or HEVC. MVC and/or 3DV extensions of video coding standards can be achieved, in some instances, using high level syntax (HLS) changes to the base standard. For example, rather than introducing new coding structures, certain existing coding structures may be redefined or used in a different way to achieve an HLS-only extension.

As an example, to code video data in accordance with MVC and 3DV extensions, video encoder 20 and video decoder 30 may be configured to perform inter-layer or inter-view prediction. That is, video encoder 20 and video decoder 30 may be configured to predict blocks of a current picture in a current view using data of a previously coded picture of a previously coded view. Typically, the previously coded picture (i.e., the inter-view reference picture) and the current picture have the same picture order count (POC) value, such that the inter-view reference picture and the current picture occur in the same access unit, and likewise, have substantially the same output order (or display order).

HEVC distinguishes long-term from short-term reference pictures. In the techniques of HEVC, long-term pictures are stored in a decoded picture buffer (DPB) relatively longer than short-term reference pictures. Additionally, syntax elements are used to indicate whether a reference picture is a long-term or a short-term reference picture. In some examples, in MVC and 3DV, long-term reference pictures may instead correspond to temporal reference pictures (i.e., of the same layer or view as a current picture being coded)

while short-term reference pictures may instead correspond to inter-view reference pictures (i.e., of a different layer or view as the current picture being coded). Thus, the use of long-term and short-term reference pictures can also provide an indication of whether a reference picture is a temporal reference picture or an inter-view reference picture. Likewise, a motion vector referring to a long-term reference picture may comprise a temporal motion vector, whereas a motion vector referring to a short-term reference picture may comprise a disparity motion vector.

Video encoder 20 and video decoder 30 may be configured to perform various modes of motion vector prediction. In one example, merge mode, video encoder 20 and video decoder 30 may be configured to code a merge flag representative of from which of a plurality of neighboring blocks to inherit motion parameters, such as, for example, a reference picture list from which to select a reference picture, a reference index indicative of the reference picture in the reference list, a horizontal motion vector component, and a vertical motion vector component.

In another example, advanced motion vector prediction (AMVP), video encoder 20 and video decoder 30 may be configured to code an indication of a reference picture list from which to select a reference picture, a reference index indicative of a reference picture in the reference picture list, a motion vector difference value, and an AMVP index representative of a neighboring block from which to select a motion vector predictor.

In merge mode and/or AMVP mode, or other such motion vector coding modes, video encoder 20 and video decoder 30 may be configured not to use motion information from a neighboring block that uses a motion vector of a different type than a motion vector of a current block. That is, video encoder 20 and video decoder 30 may be configured to determine a first type for a current motion vector, a second type for a candidate motion vector predictor, and if the first type is not the same as the second type, to disable the use of the candidate motion vector predictor as a motion vector predictor for the current motion vector.

To disable the candidate motion vector predictor, video encoder 20 and video decoder 30 may set a variable representative of whether the candidate motion vector predictor is available for use as a motion vector predictor for the current motion vector. Video encoder 20 and video decoder 30 may set a value for this variable to indicate that the candidate motion vector predictor is not available, even when the candidate motion vector predictor had previously been considered available based on other conditions that indicated that the candidate motion vector predictor was available. For example, as explained in greater detail below, video encoder 20 and video decoder 30 may associate a variable with the candidate motion vector predictor, where the value of the variable indicates whether the candidate motion vector predictor is available for use as a motion vector predictor for the current motion vector.

In particular, video encoder 20 may be configured to determine a set of motion vector predictors that are available for use to predict the current motion vector. Video decoder 30 may also be configured to construct such a set, or alternatively, video encoder 20 may signal the set of motion vector predictors that are available. In any case, video encoder 20 and video decoder 30 may determine a set of available motion vector predictors, and select one of the set of motion vector predictors as the actual motion vector predictor to use to code the current motion vector.

In AMVP mode, video encoder 20 may calculate motion vector difference values between the current motion vector and the motion vector predictor and code the motion vector difference values. Likewise, video decoder 30 may combine the motion vector difference values with the determined motion vector predictor to reconstruct the current motion vector (i.e., a motion vector for a current block of video data, e.g., a current PU). In merge mode, the actual motion vector predictor may be used as the current motion vector. Thus, in merge mode, video encoder 20 and video decoder 30 may treat the motion vector difference values as being zero-valued.

Video encoder 20 and video decoder 30 may, in some instances, determine one or more motion vector predictors from a collocated block of a temporally separate picture (that is, a collocated block in a previously coded picture), which are referred to as temporal motion vector predictors (TMVPs). To determine a TMVP for a current block (e.g., a current prediction unit (PU) of a current coding unit (CU) in HEVC), video encoder 20 and video decoder 30 may first identify a co-located picture. If the current picture is a B slice, video encoder 20 may signal a collocated_from_l0_flag in a slice header of a slice of the current picture to indicate whether the co-located picture is from RefPicList0 or RefPicList1, which may be decoded by video decoder 30. After a reference picture list is identified, video decoder 30 may use a collocated_ref_idx syntax element, signaled in the slice header, to identify the co-located picture in the reference picture list. Video decoder 30 may then identify a co-located PU by checking the co-located picture. Either the motion vector of the right-bottom PU of the CU containing the current PU, or the motion vector of the right-bottom PU within the center PUs of the CU containing this PU, may be treated as the TMVP for the current PU.

According to aspects of this disclosure, video encoder 20 and video decoder 30 may use a so-called "low delay choice" condition, as described above, to select a TMVP. However, in some instances, rather than determining a POC value of each reference picture of reference picture lists (list 0 and list 1) and comparing the POC values to the POC value of the current picture to resolve the low delay choice condition, video encoder 20 and video decoder 30 may use short-term and/or long-term reference picture markings to determine a TMVP. For example, according to aspects of this disclosure, when determining reference pictures for one or more TMVPs using a low delay choice condition, video encoder 20 and video decoder 30 may determine the reference pictures used for TMVP based on whether the reference picture lists contain short-term or long-term pictures.

According to aspects of this disclosure, video encoder 20 and video decoder 30 may determine whether each reference picture of a plurality of reference pictures included in one or more reference picture lists for a block of video data is a short term reference picture or a long term reference picture. When a predetermined number of reference pictures are long term reference pictures, video encoder 20 and video decoder 30 may determine at least one motion vector predictor for the block of video data based on one or more motion vectors of at least one co-located block of video data in at least one of the plurality of reference pictures and without comparing a picture order count (POC) value of the plurality of reference pictures to a POC value of a current picture that includes the block of video data.

In an example, according to aspects of this disclosure, when a current picture being coded does not contain any temporal short-term reference pictures (all of the reference pictures are long term reference pictures), video encoder 20 and video decoder 30 may determine a TMVP using the "not low delay choice" condition described above. That is, video encoder 20 and video decoder 30 may derive a potentially bi-directional TMVP from the reference list specified by the collocated_from_l0_flag. In this case, video encoder 20 and video decoder 30 may derive the TMVP using a motion vector of the co-located block that points to the same reference picture list as indicated by the collocated_from_l0_flag.

In the example described above, as noted above, video encoder 20 and video decoder 30 may determine the TMVP without comparing the POC value of the current picture to the POC value of each reference picture in the reference pictures lists, which may provide an efficiency gain when determining a TMVP. For example, the selection of the reference picture for the TMVP may be determined without determining and comparing POC values for all pictures, because video encoder 20 and video decoder 30 may mark inter-view and inter-layer pictures as long-term reference pictures and therefore have the same POC value as the current picture, i.e., the low delay condition is false.

In another example, when a current picture being coded does not contain any temporal short-term reference pictures (all of the reference pictures are long term reference pictures), video encoder 20 and video decoder 30 may determine a TMVP using the "low delay choice" condition described above. In this case, video encoder 20 and video decoder 30 may determine a potentially bi-directional TMVP according to the corresponding direction of the co-located picture. For example, video encoder 20 and video decoder 30 may determine a TMVP for a motion vector pointing to a reference picture in RefPicList0 using a motion vector of the co-located block that points to a reference picture in RefPicList0. Video encoder 20 and video decoder 30 may determine a TMVP for a motion vector pointing to a reference picture in RefPicList1 using a motion vector of the co-located block that points to a reference picture in RefPicList1.

Again, in this example, the TMVP determination may be performed without comparing the POC value of the current picture to the POC value of each reference picture in the reference pictures lists, which may provide an efficiency gain when determining a TMVP.

A video coder, such as video encoder 20 and video decoder 30, may derive a TMVP for this example using the following procedure (where numbers in the format #-### refer to specific sections of the HEVC standard, and bold and italics represent departures from the standard, in this example). The following definitions apply to the procedures below:

The function RefPicTypeFunc(pic) is defined, which returns the RefPicTypeIdc value of the reference picture pic.

RefPicTypeFuncMV(mv) returns 0 if the reference index of the motion vector my points to a temporal reference picture and returns 1 if the reference index of the motion vector my points to a picture in a different view/layer.

Alternatively, RefPicTypeFunc(pic) returns 0 if pic is a short-term reference picture, and returns 1 if pic is a long-term picture. RefPicTypeFuncMV(mv) returns 0 if the reference index of the motion vector my points to a short-term reference picture and returns 1 if the reference index of the motion vector my points to a long-term reference picture.

Derivation Process for Temporal Luma Motion Vector Prediction

Inputs to this process are
a luma location (xP, yP) specifying the top-left luma sample of the current prediction unit relative to the top-left sample of the current picture,
variables specifying the width and the height of the prediction unit for luma, nPSW and nPSH,
the reference index of the current prediction unit partition refIdxLX (with X being 0 or 1).

Outputs of this process are
the motion vector prediction mvLXCol,
the availability flag availableFlagLXCol.

The function RefPicOrderCnt(picX, refIdx, LX) returns the picture order count PicOrderCntVal of the reference picture with index refIdx from reference picture list LX of the picture picX and is specified as follows.

$$\text{RefPicOrderCnt}(picX, refIdx, LX) = \text{PicOrderCnt}(\text{RefPicList}LX(refIdx) \text{ of the picture } picX) \quad (8\ 141)$$

Depending on the values of slice_type, collocated_from_l0_flag, and collocated_ref_idx, the variable colPic, specifying the picture that contains the collocated partition, is derived as follows.

If slice_type is equal to B and collocated_from_l0_flag is equal to 0, the variable colPic specifies the picture that contains the collocated partition as specified by RefPicList1 [collocated_ref_idx].

Otherwise (slice_type is equal to B and collocated_from_l0_flag is equal to 1 or slice_type is equal to P), the variable colPic specifies the picture that contains the collocated partition as specified by RefPicList0[collocated_ref_idx].

Variable colPu and its position (xPCol, yPCol) are derived in the following ordered steps:

1. The variable colPu is derived as follows $$yPRb = yP + nPSH \quad (8\text{-}149)$$

If (yP>>Log 2CtbSize) is equal to (yPRb>>Log 2CtbSize), the horizontal component of the right-bottom luma position of the current prediction unit is defined by $$xPRb = xP + nPSW \quad (8\text{-}150)$$

and the variable colPu is set as the prediction unit covering the modified position given by ((xPRb>>4)<<4, (yPRb>>4)<<4) inside the colPic.

Otherwise ((yP>>Log 2CtbSize) is not equal to (yPRb>>Log 2CtbSize)), colPu is marked as "unavailable".

2. When colPu is coded in an intra prediction mode or colPu is marked as "unavailable", the following applies.

Central luma position of the current prediction unit is defined by $$xPCtr = (xP + (nPSW >> 1)) \quad (8\text{-}151)$$

$$yPCtr = (yP + (nPSH >> 1)) \quad (8\text{-}152)$$

The variable colPu is set as the prediction unit covering the modified position given by ((xPCtr>>4)<<4, (yPCtr>>4)<<4) inside the colPic.

3. (xPCol, yPCol) is set equal to the top-left luma sample of the colPu relative to the top-left luma sample of the colPic.

The function LongTermRefPic(picX, refIdx, LX) is defined as follows. If the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0.

The variables mvLXCol and availableFlagLXCol are derived as follows.

If one of the following conditions is true, both components of mvLXCol are set equal to 0 and availableFlagLXCol is set equal to 0.

colPu is coded in an intra prediction mode.

colPu is marked as "unavailable".
pic_temporal_mvp_enable_flag is equal to 0.
Otherwise, the motion vector mvCol, the reference index refIdxCol, and the reference list identifier listCol are derived as follows.
If PredFlagL0[xPCol][yPCol] is equal to 0, mvCol, refIdxCol, and listCol are set equal to MvL1[xPCol][yPCol], RefIdxL1[xPCol][yPCol], and L1, respectively.
Otherwise (PredFlagL0[xPCol][yPCol] is equal to 1), the following applies.
If PredFlagL1[xPCol][yPCol] is equal to 0, mvCol, refIdxCol, and listCol are set equal to MvL0[xPCol][yPCol], RefIdxL0[xPCol][yPCol], and L0, respectively.
Otherwise (PredFlagL1[xPCol][yPCol] is equal to 1), the following assignments are made.
If PicOrderCnt(pic) of every short-term picture pic in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
Otherwise (all pictures in the reference picture lists are long-term or PicOrderCnt(pic) of at least one short-term picture pic in at least one reference picture list is greater than PicOrderCntVal), mvCol, refIdxCol and listCol are set equal to MvLN[xPCol][yPCol], RefIdxLN[xPCol][yPCol] and LN, respectively with N being the value of collocated_from_l0_flag.
Alternatively, in the above implementation, video encoder 20 and video decoder 30, may derive a TMVP using the following procedure:
Otherwise (PredFlagL0[xPCol][yPCol] is equal to 1), the following applies.
If PredFlagL1[xPCol][yPCol] is equal to 0, mvCol, refIdxCol, and listCol are set equal to MvL0[xPCol][yPCol], RefIdxL0[xPCol][yPCol], and L0, respectively.
Otherwise (PredFlagL1[xPCol][yPCol] is equal to 1), the following assignments are made.
If PicOrderCnt(pic) of every pic having RefPicTypeFunc(pic) equal to 0 in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
Otherwise (all pictures in the reference picture lists having RefPicTypeFunc not equal to 0, or PicOrderCnt(pic) of at least one short-term picture pic in at least one reference picture list is greater than PicOrderCntVal), mvCol, refIdxCol and listCol are set equal to MvLN[xPCol][yPCol], RefIdxLN[xPCol][yPCol] and LN, respectively with N being the value of collocated_from_l0_flag.
In an alternative example, when at least one reference picture is not temporal short-term reference picture (at least one long term reference picture is included in the reference picture lists), video encoder 20 and video decoder 30 may determine a TMVP using the "not low delay choice" condition described above. In this case, video encoder 20 and video decoder 30 may derive a potentially bi-directional TMVP according to the pre-defined direction dictated by the slice header, i.e., from the reference list specified by the collocated_from_l0_flag.

A video coder, such as video encoder 20 and video decoder 30, may derive a TMVP for this example using the following procedure:
Derivation Process for Temporal Luma Motion Vector Prediction
Inputs to this process are
a luma location (xP, yP) specifying the top-left luma sample of the current prediction unit relative to the top-left sample of the current picture,
variables specifying the width and the height of the prediction unit for luma, nPSW and nPSH,
the reference index of the current prediction unit partition refIdxLX (with X being 0 or 1).
Outputs of this process are
the motion vector prediction mvLXCol,
the availability flag availableFlagLXCol.
The function RefPicOrderCnt(picX, refIdx, LX) returns the picture order count PicOrderCntVal of the reference picture with index refIdx from reference picture list LX of the picture picX and is specified as follows.

$$\text{RefPicOrderCnt}(picX, refIdx, LX) = \text{PicOrderCnt}(\text{RefPicList}LX(\text{refIdx}) \text{ of the picture } picX) \quad (8\text{-}141)$$

Depending on the values of slice_type, collocated_from_l0_flag, and collocated_ref_idx, the variable colPic, specifying the picture that contains the collocated partition, is derived as follows.
If slice_type is equal to B and collocated_from_l0_flag is equal to 0, the variable colPic specifies the picture that contains the collocated partition as specified by RefPicList1 [collocated_ref_idx].
Otherwise (slice_type is equal to B and collocated_from_l0_flag is equal to 1 or slice_type is equal to P), the variable colPic specifies the picture that contains the collocated partition as specified by RefPicList0[collocated_ref_idx].
Variable colPu and its position (xPCol, yPCol) are derived in the following ordered steps:
4. The variable colPu is derived as follows $$yPRb = yP + nPSH \quad (8\text{-}149)$$

If $(yP \gg \text{Log2CtbSize})$ is equal to $(yPRb \gg \text{Log2CtbSize})$, the horizontal component of the right-bottom luma position of the current prediction unit is defined by $$xPRb = xP + nPSW \quad (8\text{-}150)$$

and the variable colPu is set as the prediction unit covering the modified position given by $((xPRb \gg 4) \ll 4, (yPRb \gg 4) \ll 4)$ inside the colPic.
Otherwise $((yP \gg \text{Log2CtbSize})$ is not equal to $(yPRb \gg \text{Log2CtbSize}))$, colPu is marked as "unavailable".
5. When colPu is coded in an intra prediction mode or colPu is marked as "unavailable", the following applies.
Central luma position of the current prediction unit is defined by $$xPCtr = (xP + (nPSW \gg 1)) \quad (8\text{-}151)$$

$$yPCtr = (yP + (nPSH \gg 1)) \quad (8\text{-}152)$$

The variable colPu is set as the prediction unit covering the modified position given by $((xPCtr \gg 4) \ll 4, (yPCtr \gg 4) \ll 4)$ inside the colPic.
6. (xPCol, yPCol) is set equal to the top-left luma sample of the colPu relative to the top-left luma sample of the colPic.
The function LongTermRefPic(picX, refIdx, LX) is defined as follows. If the reference picture with index refIdx from reference picture list LX of the picture picX was marked as "used for long term reference" at the time when picX was the current picture, LongTermRefPic(picX, refIdx, LX) returns 1; otherwise LongTermRefPic(picX, refIdx, LX) returns 0. The variables mvLXCol and availableFlagLXCol are derived as follows.

If one of the following conditions is true, both components of mvLXCol are set equal to 0 and availableFlagLXCol is set equal to 0.
        colPu is coded in an intra prediction mode.
        colPu is marked as "unavailable".
        pic_temporal_mvp_enable_flag is equal to 0.
    Otherwise, the motion vector mvCol, the reference index refIdxCol, and the reference list identifier listCol are derived as follows.
        If PredFlagL0[xPCol][yPCol] is equal to 0, mvCol, refIdxCol, and listCol are set equal to MvL1[xPCol][yPCol], RefIdxL1[xPCol][yPCol], and L1, respectively.
        Otherwise (PredFlagL0[xPCol][yPCol] is equal to 1), the following applies.
            If PredFlagL1[xPCol][yPCol] is equal to 0, mvCol, refIdxCol, and listCol are set equal to MvL0[xPCol][yPCol], RefIdxL0[xPCol][yPCol], and L0, respectively.
            Otherwise (PredFlagL1[xPCol][yPCol] is equal to 1), the following assignments are made.
                If RefPicTypeFunc (pic) is equal to 0 and PicOrderCnt(pic) of every picture pic with RefPicTypeFunc (pic) equal to 0 in every reference picture lists is less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
                Otherwise (all pictures in the reference picture lists are long-term or PicOrderCnt(pic) of at least one short-term picture pic in at least one reference picture list is greater than PicOrderCntVal), mvCol, refIdxCol and listCol are set equal to MvLN[xPCol][yPCol], RefIdxLN[xPCol][yPCol] and LN, respectively with N being the value of collocated_from_l0_flag.

Alternatively, in the above implementation, video encoder 20 and video decoder 30, may derive a TMVP using the following procedure:

Otherwise (PredFlagL0[xPCol][yPCol] is equal to 1), the following applies.
        If PredFlagL1[xPCol][yPCol] is equal to 0, mvCol, refIdxCol, and listCol are set equal to MvL0[xPCol][yPCol], RefIdxL0[xPCol][yPCol], and L0, respectively.
        Otherwise (PredFlagL1[xPCol][yPCol] is equal to 1), the following assignments are made.
            If every picture pic in every reference picture lists is short-term and has PicOrderCnt(pic) less than or equal to PicOrderCntVal, mvCol, refIdxCol, and listCol are set equal to MvLX[xPCol][yPCol], RefIdxLX[xPCol][yPCol] and LX, respectively with X being the value of X this process is invoked for.
            Otherwise (all pictures in the reference picture lists are long-term or PicOrderCnt(pic) of at least one short-term picture pic in at least one reference picture list is greater than PicOrderCntVal), mvCol, refIdxCol and listCol are set equal to MvLN[xPCol][yPCol], RefIdxLN[xPCol][yPCol] and LN, respectively with N being the value of collocated_from_l0_flag.

According to another aspect of this disclosure, a constraint may be added that specifies that collocated_ref_idx corresponds to the same short-term reference picture for slices of the same picture. This constraint may be used with any combination of the techniques described above. In this example, a collocated_ref_idx syntax element specifies the reference index of the picture that contains the collocated partition. When the current slice is a P slice collocated_ref_idx refers to list 0. When the current slice is a B slice collocated_ref_idx refers to list 0 if collocated_from_l0 is 1, otherwise it refers to list 1. In addition, collocated_ref_idx may always refer to a valid list entry, and the resulting picture shall be the same for all slices of a coded picture and, according to aspects of this disclosure, shall be a short-term reference picture. When collocated_ref_idx is not present, it may be inferred to be equal to 0.

In another example, a collocated_ref_idx syntax element may specify the reference index of the picture that contains the collocated partition. When the current slice is a P slice collocated_ref_idx refers to list 0. When the current slice is a B slice collocated_ref_idx refers to list 0 if collocated_from_l0 is 1, otherwise it refers to list 1. In addition, collocated_ref_idx may always refer to a valid list entry, and the resulting picture shall be the same for all slices of a coded picture and, according to aspects of this disclosure, shall have RefPicTypeFunc not equal to 0. When collocated_ref_idx is not present, it is inferred to be equal to 0.

Other aspects of this disclosure relate to marking reference pictures as short-term reference pictures or long-term reference pictures. For example, in the HEVC base specification, during TMVP derivation, if a TMVP target picture (the picture containing the block having the motion vector that is being predicted) and a co-located picture (the picture containing the co-located block from which the TMVP is derived) are both in the base view/layer picture (e.g., collocated_ref_idx is equal to 0), the TMVP candidate is only available if the motion vector points to a long-term reference picture.

According to aspects of this disclosure, video encoder 20 and video decoder 30 may use two or more syntax elements to control the availability of a TMVP. Video encoder 20 may signal the syntax elements (e.g., control flags) in a slice header of an HEVC extension. In this example, one syntax element may indicate the availability of a TMVP for merge mode, and one syntax element may indicate the availability of a TMVP for AMVP. In an example, the syntax elements may include the following: slice_merge_temporal_mvp_enable_flag and slice_amvp_temporal_mvp_enable_flag, which may replace the slice_temporal_mvp_enable_flag currently included in HEVC. In this example, slice_merge_temporal_mvp_enable_flag may be set equal to 0 without affecting the availability of TMVP for AMVP mode.

In still another example, according to aspects of this disclosure, video encoder 20 and video decoder 30 may only mark a co-located reference picture as a short-term reference picture if the co-located picture (identified by collocated_ref_idx in HEVC) is equal to the TMVP target reference picture (indicated by reference index equal to zero in HEVC) and the co-located picture has the same layer_id (or view_id) as the current slice of the current picture. Video decoder 30 may perform the reference picture marking described above, for example, after parsing a slice header and before decoding (e.g., performing motion compensation) of a block in the slice.

Figure 2:
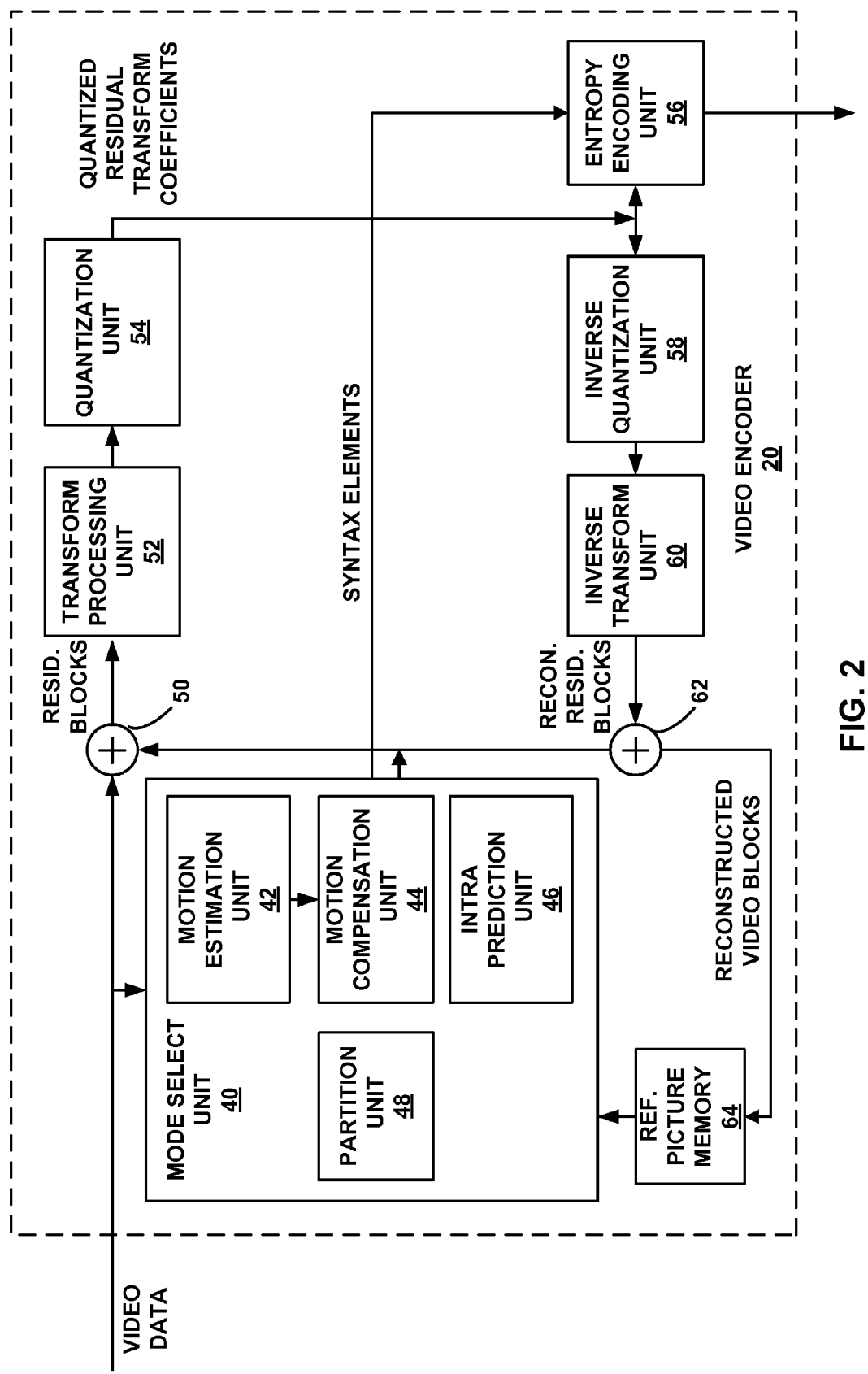
FIG. 2 is a block diagram illustrating an example of a video encoder that may implement techniques for determining a TMVP.

FIG. 2 is a block diagram illustrating an example of video encoder 20 that may implement techniques for determining a TMVP. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

In accordance with the techniques of this disclosure, when mode select unit 40 elects to inter-predict a block of video data (e.g., a PU) using motion estimation unit 42 and motion compensation unit 44, video encoder 20 may further encode the motion vector, e.g., using AMVP or merge mode. For example, entropy encoding unit 56 may receive a motion vector from mode select unit 40 and encode the motion vector. Entropy encoding unit 56 may entropy encode a motion vector using AMVP by selecting a neighboring block from which to retrieve a motion vector predictor and calculating a difference between the motion vector and the motion vector predictor (e.g., a horizontal motion vector difference and a vertical motion vector difference), then entropy encode one or more syntax elements representative of the difference(s).

Entropy encoding unit 56 may determine one or more TMVPs using a collocated block of a temporally separate picture. According to aspects of this disclosure, entropy encoding unit 56 may use a so-called "low delay choice" condition, as described above, to select a TMVP. However, rather than determining a POC value of each reference picture of reference picture lists (list 0 and list 1) and comparing the POC values to the POC value of the current picture to resolve the low delay choice condition, entropy encoding unit 56 may use short-term and/or long-term reference picture markings to determine a TMVP.

In an example, when a current picture being coded does not contain any temporal short-term reference pictures (all of the reference pictures are long term reference pictures), entropy encoding unit 56 may determine a TMVP using the "not low delay choice" condition described above. That is, entropy encoding unit 56 may derive a potentially bi-directional TMVP from the reference picture list specified by the previously determined collocated_from_l0_flag. In this case, entropy encoding unit 56 may derive the TMVP using a motion vector of the co-located block that points to the same reference picture list as indicated by the collocated_from_l0_flag.

According to aspects of this disclosure, entropy encoding unit 56 may determine the TMVP without comparing the POC value of the reference pictures of the reference picture lists to the POC value of the picture currently being coded. Entropy encoding unit 56 may improve efficiency over conventional low delay choice techniques, particularly for multiview/multilayer applications in which inter-view/inter-layer reference pictures have the same POC values as the picture currently being coded. Hence, entropy encoding unit 56 may leverage the short-term/long-term marking process to reduce the number of computations that are carried out (e.g., such as POC value checking) when determining a TMVP.

In another example, when a current picture being coded does not contain any temporal short-term reference pictures (all of the reference pictures are long term reference pictures), entropy encoding unit 56 may determine a TMVP using the "low delay choice" condition described above. In this case, entropy encoding unit 56 may determine a potentially bi-directional TMVP according to the corresponding direction of the co-located picture. For example, entropy encoding unit 56 may determine a TMVP for a motion vector pointing to a reference picture in RefPicList0 using a motion vector of the co-located block that points to a reference picture in RefPicList0. Entropy encoding unit 56 may determine a TMVP for a motion vector pointing to a reference picture in RefPicList1 using a motion vector of the co-located block that points to a reference picture in RefPicList1.

Again, in this example, entropy encoding unit 56 may perform the TMVP determination without comparing the POC value of the current picture to the POC value of each reference picture in the reference pictures lists, which may provide an efficiency gain when determining a TMVP.

In an alternative example, when at least one reference picture is not temporal short-term reference picture (at least one long term reference picture is included in the reference picture lists), entropy encoding unit 56 may determine a TMVP using the "not low delay choice" condition described above. In this case, entropy encoding unit 56 may derive a potentially bi-directional TMVP according to the pre-defined direction dictated by the slice header, i.e., from the reference list specified by the collocated_from_l0_flag.

Entropy encoding unit 56 may encode a motion vector by calculating motion vector difference values between the motion vector and the motion vector predictor. In general, a motion vector may be defined by a horizontal component (or x-component) and a vertical component (or y-component). Entropy encoding unit 56 may calculate MVDx (an x-component of a motion vector difference) as the difference between the x-component of the motion vector being encoded and the x-component of the motion vector predictor. Likewise, entropy encoding unit 56 may calculate MVDy (a y-component of the motion vector difference) as the difference between the y-component of the motion vector being encoded and the y-component of the motion vector predictor. In the case that the motion vector is a temporal motion vector, entropy encoding unit 56 may calculate the motion vector difference values (MVDx and MVDy) relative to a scaled version of the motion vector predictor (based on POC differences between reference pictures referred to by the motion vector being encoded and motion vector predictor). Entropy encoding unit 56 may then entropy encode MVDx and MVDy, e.g., using CABAC.

According to another aspect of this disclosure, video encoder 20 may conform to a constraint that specifies that collocated_ref_idx corresponds to the same short-term reference picture for slices of the same picture. These constraints may be used with any combination of the techniques described above.

According to other aspects of this disclosure, entropy encoding unit 56 may encode two or more syntax elements to control the availability of a TMVP. In this example, entropy encoding unit 56 may encode one syntax element to indicate the availability of a TMVP for merge mode, and encode one syntax element may indicate the availability of a TMVP for AMVP.

In still another example, aspects of this disclosure relate to marking reference pictures as short-term reference pictures or long-term reference pictures. For example, entropy encoding unit 56 may only mark a co-located reference picture as a short-term reference picture if the co-located picture (identified by collocated_ref_idx in HEVC) is equal to the TMVP target reference picture (indicated by reference index equal to zero in HEVC) and the co-located picture has the same layer_id (or view_id) as the current slice of the current picture.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

In this manner, video encoder 20 of FIG. 2 represents an example of a video encoder configured to determine, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, compare picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determine whether a forward motion vector or a backward motion vector of the co-located block is to be initially used to derive the motion vector predictor, derive the motion vector predictor based at least in part on the determination, and encode a motion vector for the current block of video data relative to the motion vector predictor.

Figure 3:
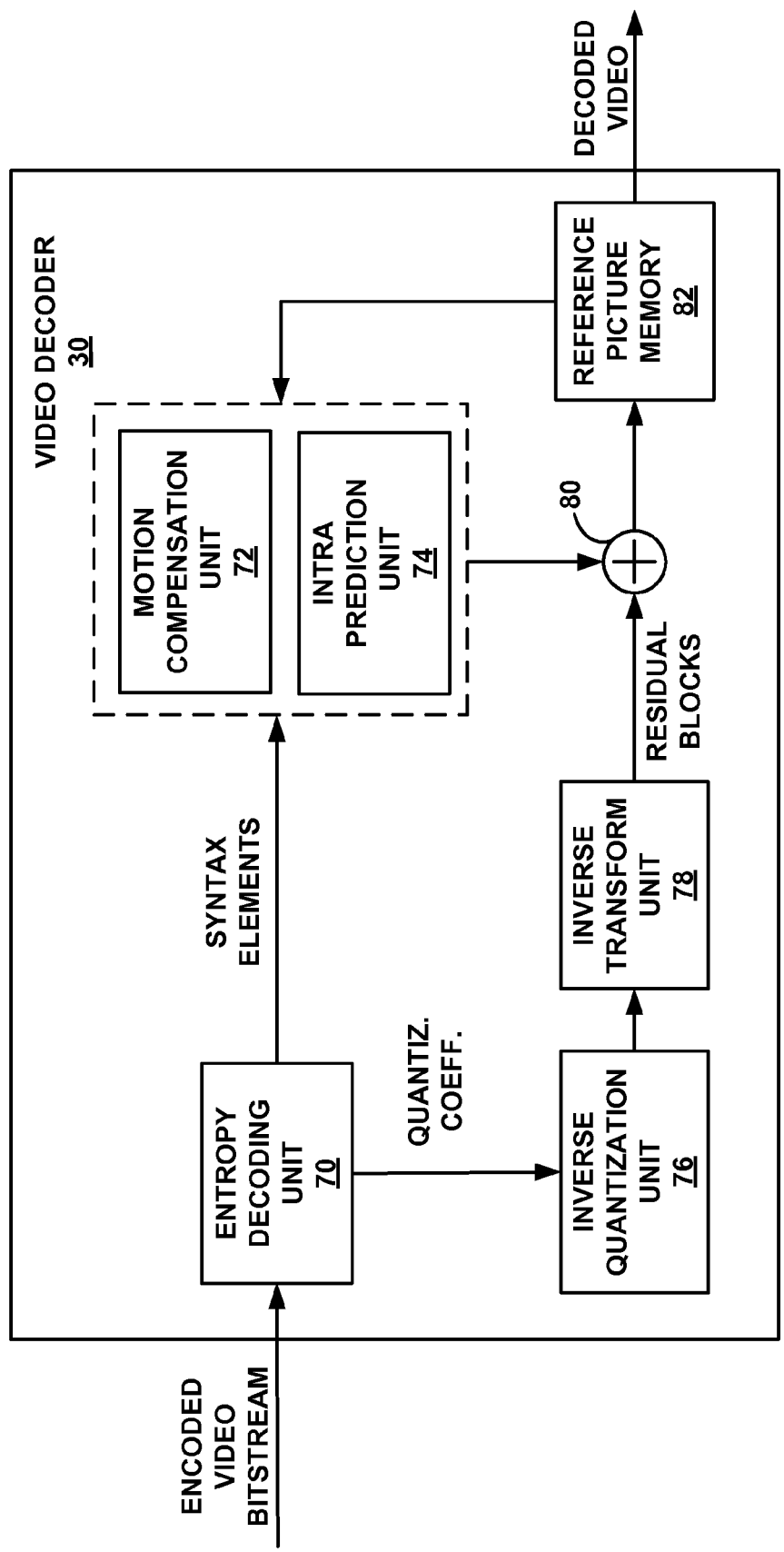
FIG. 3 is a block diagram illustrating an example of video decoder 30 that may implement techniques for determining a TMVP.

FIG. 3 is a block diagram illustrating an example of video decoder 30 that may implement techniques for coding motion vectors and for performing bi-prediction in HEVC and its extensions, such as multiview or 3DV extensions. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Entropy decoding unit 70 may entropy decode motion vectors for P- and B-coded blocks. For example, entropy decoding unit 70 may decode motion vectors using AMVP or merge mode, and may determine one or more motion vector predictors (including one or more TMVPs).

Entropy decoding unit 70 may determine one or more TMVPs using a collocated block of a temporally separate picture. According to aspects of this disclosure, entropy decoding unit 70 may use a so-called "low delay choice" condition, as described above, to select a TMVP. However, rather than determining a POC value of each reference picture of reference picture lists (list 0 and list 1) and comparing the POC values to the POC value of the current picture to resolve the low delay choice condition, entropy decoding unit 70 may use short-term and/or long-term reference picture markings to determine a TMVP.

In an example, when a current picture being coded does not contain any temporal short-term reference pictures (all of the reference pictures are long term reference pictures), entropy decoding unit 70 may determine a TMVP using the "not low delay choice" condition described above. That is, entropy decoding unit 70 may derive a potentially bi-directional TMVP from the reference picture list specified by the previously determined collocated_from_10_flag. In this case, entropy decoding unit 70 may derive the TMVP using a motion vector of the co-located block that points to the same reference picture list as indicated by the collocated_from_10_flag.

According to aspects of this disclosure, entropy decoding unit 70 may determine the TMVP without comparing the POC value of the reference pictures of the reference picture lists to the POC value of the picture currently being coded. Entropy decoding unit 70 may improve efficiency over conventional low delay choice techniques, particularly for multiview/multilayer applications in which inter-view/inter-layer reference pictures have the same POC values as the picture currently being coded. Hence, entropy decoding unit 70 may leverage the short-term/long-term marking process to reduce the number of computations that are carried out (e.g., such as POC value checking) when determining a TMVP.

In another example, when a current picture being coded does not contain any temporal short-term reference pictures (all of the reference pictures are long term reference pictures), entropy decoding unit 70 may determine a TMVP using the "low delay choice" condition described above. In this case, entropy decoding unit 70 may determine a potentially bi-directional TMVP according to the corresponding direction of the co-located picture. Again, in this example, entropy decoding unit 70 may perform the TMVP determination without comparing the POC value of the current picture to the POC value of each reference picture in the reference pictures lists, which may provide an efficiency gain when determining a TMVP.

In an alternative example, when at least one reference picture is not temporal short-term reference picture (at least one long term reference picture is included in the reference picture lists), entropy decoding unit 70 may determine a TMVP using the "not low delay choice" condition described above. In this case, entropy decoding unit 70 may derive a potentially bi-directional TMVP according to the pre-defined direction dictated by the slice header, i.e., from the reference list specified by the collocated_from_10_flag.

To decode a current motion vector, entropy decoding unit 70 may select one of a plurality of candidate motion vector predictors (e.g., as indicated by syntax data, or according to an implicit selection process). When the selected motion vector predictor is a temporal motion vector, entropy decoding unit 70 may scale the selected motion vector predictor based on POC differences between the reference picture to which the motion vector predictor refers and the reference picture to which the current motion vector refers. Entropy decoding unit 70 may also decode syntax elements representing an MVDx value (that is, a horizontal or x-component of a motion vector difference) and an MVDy value (that is, a vertical or y-component of the motion vector difference). Entropy decoding unit 70 may also add the MVDx value to an x-component of the selected (and potentially scaled) motion vector predictor to reproduce the x-component of the current motion vector, and add the MVDy value to a y-component of the selected (and potentially scaled) motion vector predictor to reproduce the y-component of the current motion vector. Entropy decoding unit 70 may provide the reproduced (i.e., decoded) motion vector to motion compensation unit 72.

Motion compensation unit 72 may use the decoded motion vector to retrieve data from a previously decoded picture, e.g., from reference picture memory 82. Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

Video decoder 30 may be configured to perform a decoding process in accordance with one or more techniques of this disclosure. In some examples, according to another aspect of this disclosure, video decoder 30 may conform to a constraint that specifies that collocated_ref_idx corresponds to the same short-term reference picture for slices of the same picture. These constraints may be used with any combination of the techniques described above.

According to other aspects of this disclosure, video decoder 30 may parse and utilize two or more syntax elements to control the availability of a TMVP. In this example, entropy decoding unit 70 may decode one syntax element to indicate the availability of a TMVP for merge mode, and decode one syntax element may indicate the availability of a TMVP for AMVP.

In still another example, aspects of this disclosure relate to marking reference pictures as short-term reference pictures or long-term reference pictures. For example, video decoder 30 may only mark a co-located reference picture as a short-term reference picture if the co-located picture (identified by collocated_ref_idx in HEVC) is equal to the TMVP target reference picture (indicated by reference index equal to zero in HEVC) and the co-located picture has the same layer_id (or view_id) as the current slice of the current picture.

In this manner, video decoder 30 of FIG. 3 represents an example of a video decoder configured to determine, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, compare picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determine whether a forward motion vector or a backward motion vector of the co-located block is to be initially used to derive the motion vector predictor, derive the motion vector predictor based at least in part on the determination, and decode a motion vector for the current block of video data relative to the motion vector predictor.

Figure 4:
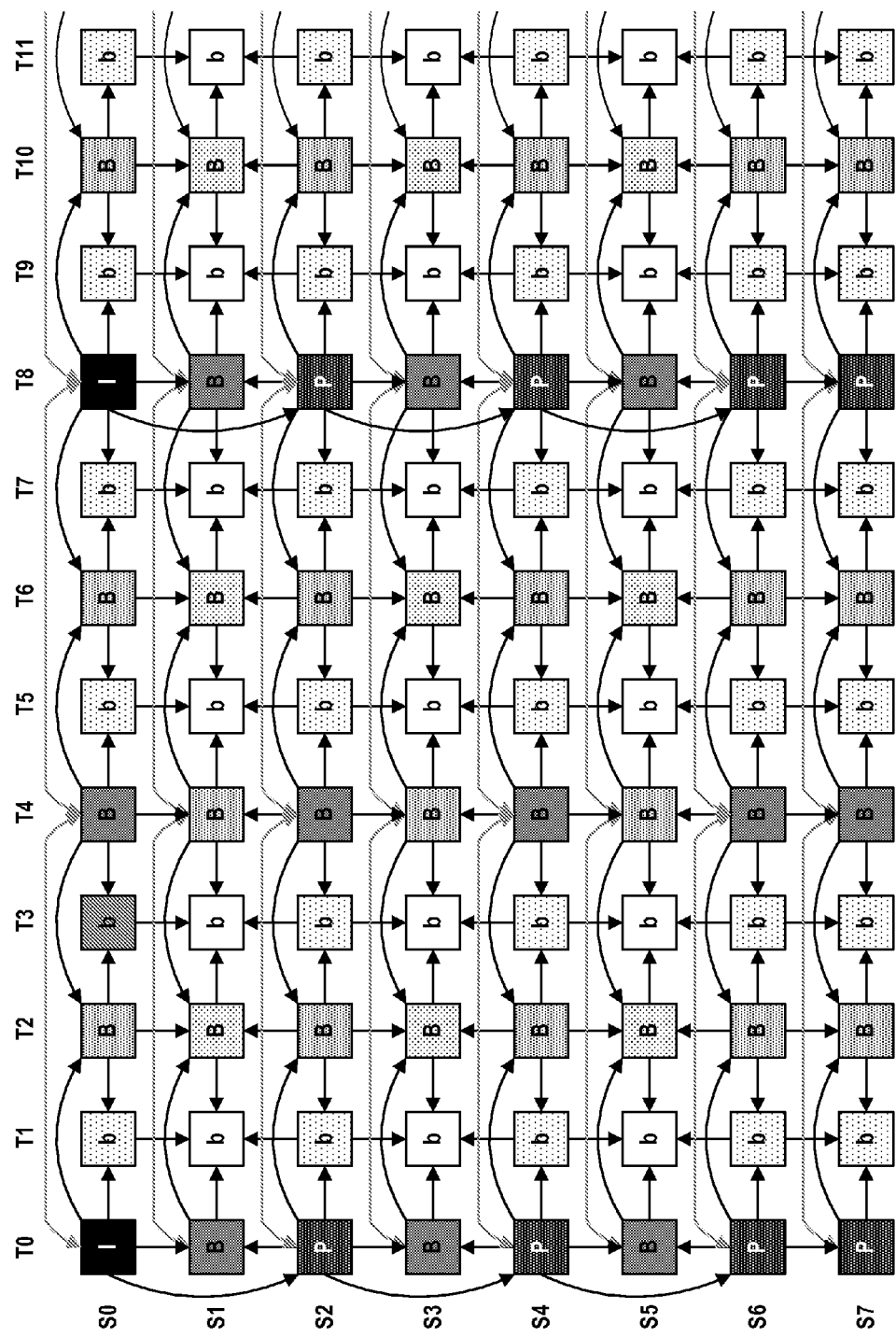
FIG. 4 is a conceptual diagram illustrating an example MVC prediction pattern.

FIG. 4 is a conceptual diagram illustrating an example MVC prediction pattern. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, the advantage of MVC is that it could support an example that uses more than two views as a 3D video input and decodes this 3D video represented by the multiple views. A renderer of a client having an MVC decoder may expect 3D video content with multiple views.

Frames in FIG. 4 are indicated at the intersection of each row and each column in FIG. 4 using a shaded block including a letter, designating whether the corresponding frame is intracoded (that is, an I-frame), or inter-coded in one direction (that is, as a P-frame) or in multiple directions (that is, as a B-frame). In general, predictions are indicated by arrows, where the pointed-to frame uses the point-from object for prediction reference. For example, the P-frame of view S2 at temporal location T0 is predicted from the I-frame of view S0 at temporal location T0.

As with single view video encoding, frames of a multiview video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So a rendering device with an MVC decoder may expect 3D video contents with more than two views.

In MVC, inter-view prediction is allowed among pictures in the same access unit (that is, with the same time instance). An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

FIG. 4 provides various examples of inter-view prediction. Frames of view S1, in the example of FIG. 4, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between frames, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. In some examples, the decoding of the view components shall follow the ascending order of the view order index. If all the views are presented, then the view order indexes are in a consecutive order from 0 to num_views_minus 1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view 51 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 4. Also, with respect to the example of FIG. 4, S0>S1, S2>S1, S2>S3, S4>S3, S4>S5, and S6>S5. Any decoding order for the views that does not violate these requirements is possible. Accordingly, many different decoding orders are possible, with only certain limitations.

In accordance with certain examples of the techniques of this disclosure, a video coder may be configured to skip comparing POC values of reference pictures to the POC value of a current picture in certain circumstances, e.g., when all reference pictures are long-term reference pictures. As discussed above, in MVC or 3DV, inter-view reference pictures may be characterized as long-term reference pictures, while temporal reference pictures may be characterized as short-term reference pictures.

Thus, assuming that the current picture is the B-picture in view S5 at time T6, inter-view reference pictures may correspond to pictures in views S0, S1, S2, S3, S4, and/or S6 at time T6. These reference pictures may be labeled long-term reference pictures. If these, or a subset of these, inter-view pictures are the only reference pictures for the B-picture in view S5 at time T6 (i.e., if this picture only has long-term reference pictures), a video coder may skip comparing POC values for the reference pictures to the POC value for the current picture, because as can be seen from FIG. 4, each of these reference pictures has the same display order, and hence, the same POC value, as the current picture. Accordingly, the video coder may skip the POC value comparison and proceed to select the low delay choice for TMVP, in accordance with techniques of this disclosure.

Figure 5:
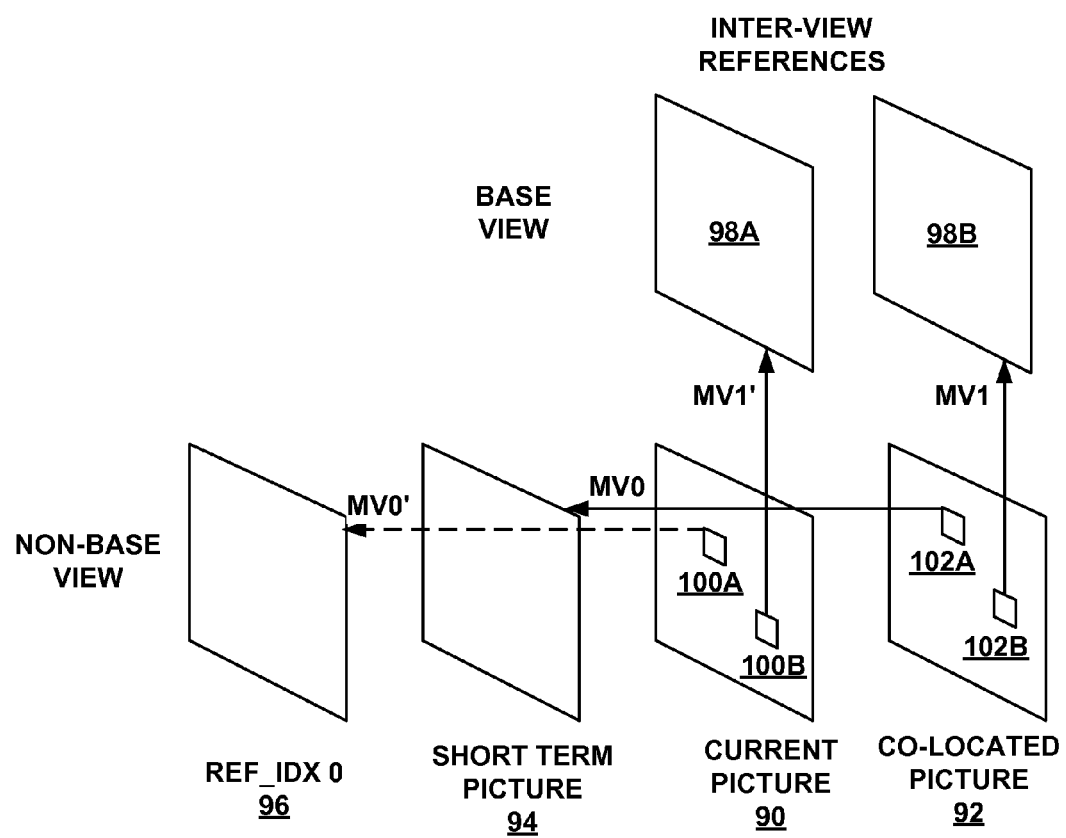
FIG. 5 is a conceptual diagram illustrating determining a TMVP.

FIG. 5 is a conceptual diagram illustrating determining a TMVP. The example shown in FIG. 5 includes a picture currently being coded ("current picture") 90, a co-located reference picture ("co-located picture") 92, a short-term reference picture ("short-term picture" 94), a reference picture having an index of zero in a reference picture list for the current picture ("ref_idx 0") 96, and two base view inter-view reference pictures 98A and 98B.

Although picture 92 is referred to as a "co-located reference picture," it should be understood that this is intended to refer to a picture that includes a co-located block for a current block of current picture 90. That is, "co-located reference picture" is used as notational short-hand to refer to a picture including a co-located block for a current block of a current picture, and not necessarily to a picture that is co-located with the current picture. Of course, in some examples, the co-located picture may correspond to an inter-view reference picture that is indeed co-located with current picture 90.

To determine a TMVP for current block 100A of current picture 90, a video coder (such as video encoder 20 or video decoder 30) may first identify co-located picture 92. The video coder may identify co-located picture 92 based on a syntax element, e.g., a collocated_from_l0_flag signaled in a slice header that indicates whether the co-located picture is from RefPicList0 or RefPicList1. After co-located picture 92 is identified, the video coder identifies the co-located picture in the appropriate reference picture list. The video coder then identifies co-located block 102A by checking co-located picture 92. In this example, TMVP MV0 (for motion vector MV0') is a temporal motion vector.

Likewise, to determine a TMVP for current block 100B of current picture 90, the video coder again identifies co-located picture 92. The video coder may identify co-located picture 92 based on a syntax element, e.g., a collocated_from_l0_flag signaled in a slice header that indicates whether the co-located picture is from RefPicList0 or RefPicList1. After co-located picture 92 is identified, the video coder identifies the co-located picture in the appropriate reference picture list. The video coder then identifies co-located block 102B by checking co-located picture 92. In this example, TMVP MV1 (for motion vector MV1') is a disparity (inter-view/inter-layer) motion vector.

When motion vectors identified by the above process are used to generate a motion candidate for AMVP or merge mode, they may be scaled based on the temporal location (reflected by POC value of the reference picture). For scaled motion vector predictor candidates, the video coder may determine whether the target reference picture (such as short term picture 94 or picture 98B for MV0 and MV1, respectively) are the same type as the reference picture of current picture 90. The video coder may determine whether the TMVP is available for prediction based on the reference picture types, as shown in Table 1 below:

TABLE 1

| Reference Picture for Target MV | Reference Picture for Motion Vector Predictor | Motion Vector Predictor Availability |
| --- | --- | --- |
| Short-term Reference Picture | Short-term Reference Picture | Available |
| Short-term Reference Picture | Long-term Reference Picture | Unavailable |
| Long-term Reference Picture | Short-term Reference Picture | Unavailable |
| Long-term Reference Picture | Long-term Reference Picture | Available but not scaled |

In HEVC extensions without block level tools (using high level syntax changes), a reference picture from a base layer/view is marked as a long-term reference picture in reference picture memory.

In the HEVC base specification, during TMVP derivation, if a TMVP target picture (the picture containing the block having the motion vector that is being predicted) and a co-located picture (the picture containing the co-located block from which the TMVP is derived) are both in the base view/layer picture (e.g., collocated_ref_idx is equal to 0), the TMVP candidate is only available if the motion vector points to a long-term reference picture.

However, this long-term reference picture condition may result in an unreliable motion vector being used for TMVP, particularly when HEVC is extended for multiview/multi-layer coding. For example, a temporal motion vector (pointing to a temporal long-term reference) may be used to generate a TMVP candidate for an inter-view/layer motion vector (pointing to an inter-view/layer reference picture). Such a TMVP candidate may be relatively large; however, the inter-view/layer motion vector being predicted should be relatively small.

Aspects of this disclosure address the issue identified above. According to aspects of this disclosure, the co-located reference picture (such as co-located picture 92) may be marked as a short-term reference picture only if the co-located picture (identified by collocated_ref_idx in HEVC) is equal to the TMVP target reference picture (ref_idx 0, 96 in HEVC) and the co-located picture has the same layer_id (or view_id) as the current slice of the current picture. Hence, the video coder may avoid using a motion vector associated with a long-term reference picture to predict a motion vector pointing to an inter-view/layer reference picture.

Figure 6:
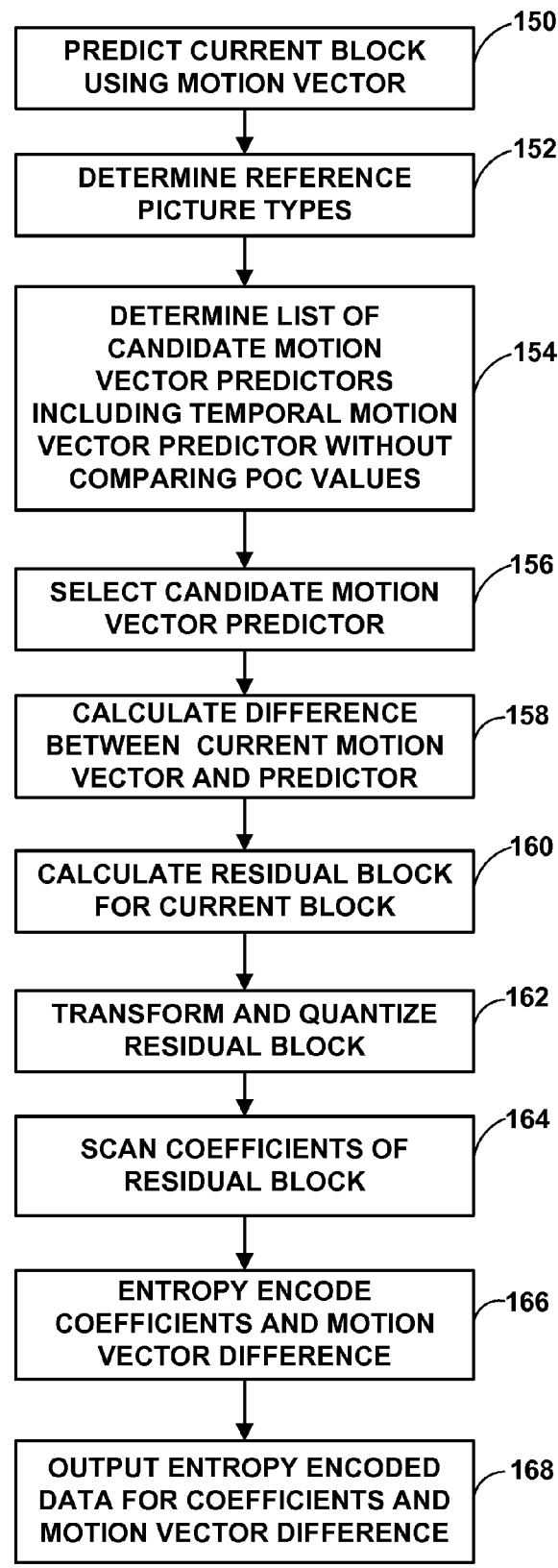
FIG. 6 is a flowchart illustrating an example method for encoding a current block in accordance with the techniques of this disclosure.

FIG. 6 is a flowchart illustrating an example method for encoding a current block in accordance with the techniques of this disclosure. The current block may comprise a current CU or a portion of the current CU, e.g., a current PU. Although described with respect to video encoder 20 (FIGS. 1 and 2), it should be understood that other devices may be configured to perform a method similar to that of FIG. 6.

In this example, video encoder 20 initially predicts the current block (150). For example, video encoder 20 may calculate one or more prediction units (PUs) for the current block. In this example, it is assumed that video encoder 20 inter-predicts the current block. For example, motion estimation unit 42 may calculate a motion vector for the current block by performing a motion search of previously coded pictures, e.g., inter-view pictures and temporal pictures. Thus, motion estimation unit 42 may produce a temporal motion vector or a disparity motion vector to encode the current block.

Video encoder 20 may also determine reference picture types of reference pictures in the reference picture list(s) for the current block (152). For example, video encoder 20 may determine whether reference pictures in the reference picture lists for the current block are marked as short-term reference pictures or long-term reference pictures.

Video encoder 20 may then encode the motion vector. In particular, entropy encoding unit 56 may determine a list of candidate motion vector predictors including a temporal motion vector predictor (TMVP) without comparing POC values of the reference pictures of the reference picture lists to the POC value of the picture including the block currently being encoded (154). For example, as noted above, entropy encoding unit 56 may determine a TMVP based on a "low delay choice" condition, but without comparing POC values of the reference picture to the POC value of the picture including the block currently being coded to determine the existence of the low delay choice condition.

Instead, according to aspects of this disclosure, entropy encoding unit 56 may use the short-term/long-term reference picture markings (as determined, for example, in step 152) to select a TMVP for the current block. For example, when a predetermined number of reference pictures included in the reference picture lists are long-term reference pictures, entropy encoding unit 56 may determined a TMVP for the current block based on a low delay choice condition being false. That is, a potentially bi-directional TMVP may derived from the reference list specified by the collocated_from_10_flag. In another example, entropy encoding unit 56 may determined a TMVP for the current block based on a low delay choice condition being true. That is, entropy encoding unit 56 may derive TMVPs from the corresponding direction of the co-located picture.

The predetermined number of long term reference pictures may include all of the reference pictures in the reference picture lists, or, alternatively, at least one reference picture in the reference picture lists.

After forming the list of candidate motion vector predictors, entropy encoding unit 56 selects one of the candidate motion vector predictors to use as a motion vector predictor for the current motion vector (156). Entropy encoding unit 56 then calculates the difference between the current motion vector and the selected (and potentially scaled) motion vector predictor (158).

Video encoder 20 may then calculate a residual block for the current block, e.g., to produce a transform unit (TU) (160). To calculate the residual block, video encoder 20 may calculate a difference between the original, uncoded block and the predicted block for the current block. Video encoder 20 may then transform and quantize coefficients of the residual block (162). Next, video encoder 20 may scan the quantized transform coefficients of the residual block (164). During the scan, or following the scan, video encoder 20 may entropy encode the coefficients (166). For example, video encoder 20 may encode the coefficients using CAVLC or CABAC. Video encoder 20 may then output the entropy coded data of the block (168).

In this manner, the method of FIG. 6 represents an example of a method for encoding video data, the method including determining, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, comparing picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determining whether a forward motion vector or a backward motion vector of the co-located block is to be initially used to derive the motion vector predictor, deriving the motion vector predictor based at least in part on the determination, and encoding a motion vector for the current block of video data relative to the motion vector predictor.

Figure 7:
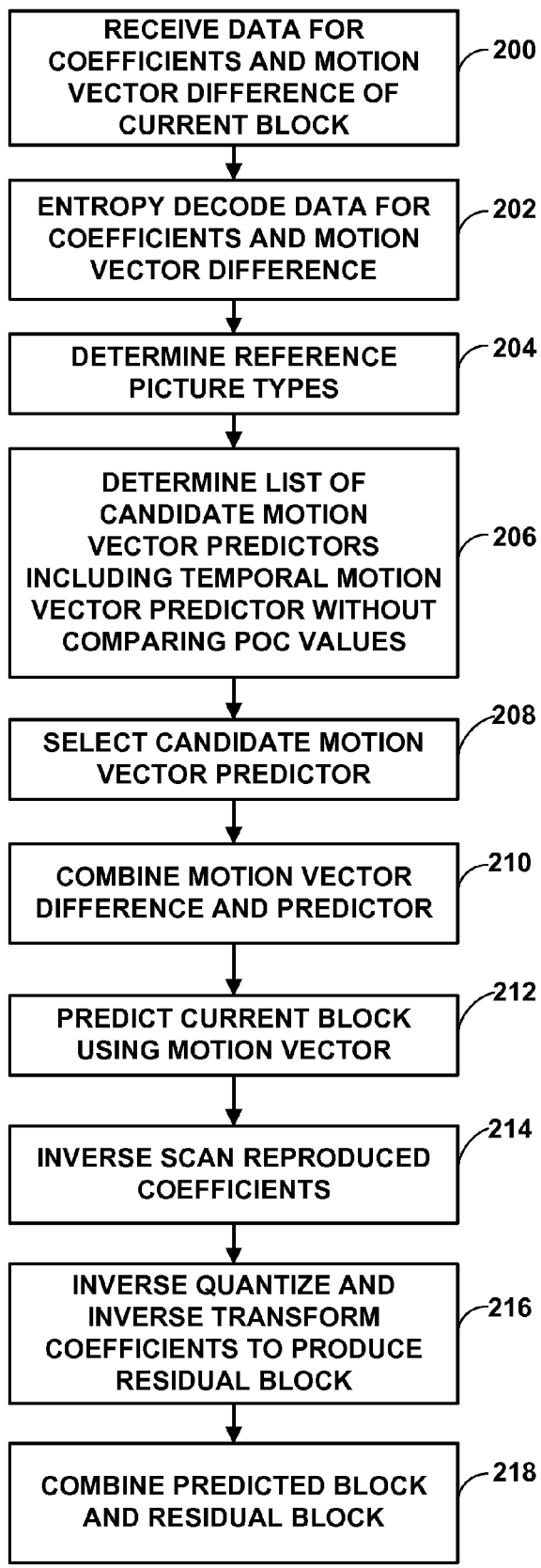
FIG. 7 is a flowchart illustrating an example method for decoding a current block of video data in accordance with the techniques of this disclosure.

FIG. 7 is a flowchart illustrating an example method for decoding a current block of video data in accordance with the techniques of this disclosure. The current block may comprise a current CU or a portion of the current CU (e.g., a PU). Although described with respect to video decoder 30 (FIGS. 1 and 3), it should be understood that other devices may be configured to perform a method similar to that of FIG. 7.

Initially, video decoder 30 receives data for transform coefficients and motion vector difference values of the current block (200). Entropy decoding unit 70 entropy decodes the data for the coefficients and the motion vector difference values (202).

Video decoder 30 may also determine reference picture types of reference pictures in the reference picture list(s) for the current block (204). For example, video decoder 30 may determine whether reference pictures in the reference picture lists for the current block are marked as short-term reference pictures or long-term reference pictures.

Video decoder 30 may then decode the motion vector. In particular, entropy decoding unit 70 may determine a list of candidate motion vector predictors including a temporal motion vector predictor (TMVP) without comparing POC values of the reference pictures of the reference picture lists to the POC value of the picture including the block currently being encoded (206). For example, as noted above, entropy decoding unit 70 may determine a TMVP based on a "low delay choice" condition, but without comparing POC values of the reference picture to the POC value of the picture including the block currently being coded to determine the existence of the low delay choice condition.

Instead, according to aspects of this disclosure, entropy decoding unit 70 may use the short-term/long-term reference picture markings (as determined, for example, in step 204) to select a TMVP for the current block. For example, when a predetermined number of reference pictures included in the reference picture lists are long-term reference pictures, entropy decoding unit 70 may determined a TMVP for the current block based on a low delay choice condition being false. That is, a potentially bi-directional TMVP may derived from the reference list specified by the collocated_from_l0_flag. In another example, entropy decoding unit 70 may determined a TMVP for the current block based on a low delay choice condition being true. That is, entropy decoding unit 70 may derive TMVPs from the corresponding direction of the co-located picture.

The predetermined number of long term reference pictures may include all of the reference pictures in the reference picture lists, or, alternatively, at least one reference picture in the reference picture lists.

Entropy decoding unit 70 then selects one of the candidate motion vector predictors as the motion vector predictor for the current motion vector (208). In some examples, entropy decoding unit 70 selects the motion vector predictor according to an implicit, predefined process, whereas in other examples, entropy decoding unit 70 decodes a syntax element indicative of which of the list of candidate motion vectors to select. Entropy decoding unit 70 then mathematically combines the decoded motion vector difference values with the motion vector predictor to reproduce the current motion vector (210). For example, entropy decoding unit 70 may add the x-component of the motion vector difference (MVDx) to the x-component of the selected motion vector predictor, and the y-component of the motion vector difference (MVDy) to the y-component of the selected motion vector predictor.

Video decoder 30 may predict the current block using the decoded motion vector (212). Video decoder 30 may then inverse scan the reproduced coefficients (214), to create a block of quantized transform coefficients. Video decoder 30 may then inverse quantize and inverse transform the coefficients to produce a residual block (216). Video decoder 30 may ultimately decode the current block by combining the predicted block and the residual block (218).

In this manner, the method of FIG. 7 represents an example of a method of decoding video data, the method including determining, for each reference picture in one or more reference picture lists for a current picture, whether the reference picture is to be included in a plurality of reference pictures based at least in part on whether at least one of the reference pictures in the reference picture lists is a short-term reference picture or a long-term reference picture, comparing picture order count (POC) values of each of the plurality of reference pictures to a POC value of the current picture to determine at least one motion vector predictor for a current block of the current picture based on one or more motion vectors of at least one co-located block of video data in at least one of the plurality of reference pictures, determining whether a forward motion vector or a backward motion vector of the co-located block is to be initially used to derive the motion vector predictor, deriving the motion vector predictor based at least in part on the determination, and decoding a motion vector for the current block of video data relative to the motion vector predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining, for each reference picture in one or more reference picture lists for a current picture, whether to include the reference picture in a plurality of reference pictures for determining at least one motion vector predictor for a current block in the current picture, wherein the determination is based at least in part on whether the reference picture is a short-term reference picture or a long-term reference picture;
   determining, for at least one co-located block of the current block of video data in at least one picture of the plurality of reference pictures, whether a forward motion vector or a backward motion vector of the at least one co-located block of video data is used to derive the at least one motion vector predictor;
   determining the at least one motion vector predictor for the current block of the current picture based on the determination of whether the forward motion vector or the backward motion vector is used, one or more motion vectors of the at least one co-located block, and a comparison of a picture order count (POC) value of each picture of the plurality of reference pictures to a POC value of the current picture; and
   decoding a motion vector for the current block of video data relative to the at least one motion vector predictor.

2. The method of claim 1, wherein determining whether to include the reference picture comprises determining that the reference picture is not included in the plurality of reference pictures when the reference picture is a short-term reference picture.

3. The method of claim 1, wherein determining whether to include the reference picture comprises determining that the reference picture is not included in the plurality of reference pictures when the reference picture is a long-term reference picture.

4. The method of claim 1, wherein determining whether the forward motion vector or the backward motion vector is initially used comprises, when all reference pictures in the plurality of reference pictures have POC values that are smaller than or equal to the POC of the current picture, determining that the initially used motion vector of the co-located block is to have the same direction as the motion vector for the current block.

5. The method of claim 4, wherein the plurality of reference pictures is empty.

6. The method of claim 1, wherein determining whether the forward motion vector or the backward motion vector is initially used comprises, when at least one reference picture of the plurality of reference pictures has a POC value larger than the POC of the current picture, determining that the initially used motion vector of the co-located block has the same direction as signaled in a slice header for a slice including the current block, regardless of the direction of the motion vector for the current block.

7. The method of claim 1, wherein long term reference pictures are one of inter-view reference pictures and inter-layer reference pictures.

8. The method of claim 1, wherein, when each of the reference pictures is a long term reference picture, determining the motion vector predictor comprises determining that the motion vector predictor corresponds to a motion vector of the co-located block that points into a reference picture list as indicated by a syntax element comprising data representative of the reference picture list.

9. The method of claim 8, wherein determining that the motion vector predictor comprises decoding a collocated_from_L0_flag, wherein the collocated_from_L0_flag identifies one of a first reference picture list comprising pictures occurring at an earlier time than the block and a second reference picture list comprising pictures occurring at a later time than the current block.

10. The method of claim 1, wherein, when each of the reference pictures is a long term reference picture, determining the at least one motion vector predictor comprises determining that the motion vector predictor corresponds to a motion vector of the co-located block that points into a reference picture list associated with the same temporal direction as a reference picture list into which the motion vector for the block points.

11. The method of claim 1, further comprising locating the at least one co-located block in a co-located picture, wherein the co-located picture is a short term reference picture and is the same for slices of video data of the picture that includes the block of video data.

12. The method of claim 1, further comprising locating the at least one co-located block in a co-located picture, wherein the co-located picture is long term reference picture and is the same for slices of video data of the picture that includes the block of video data.

13. The method of claim 1, further comprising locating the at least one co-located block in a co-located picture, wherein the current block of video data is included in a picture of a first view, and wherein the co-located picture is included in a second, different view and is the same for slices of video data of the picture that includes the block of video data.

14. The method of claim 1, further comprising marking a co-located picture that includes the at least one co-located block as a short term reference picture when a reference index of the co-located picture is equal to a reference index of a temporal motion vector predictor target picture and the co-located picture is included in the same view as the picture that includes the block of video data.

15. The method of claim 1, further comprising decoding data indicative of whether temporal motion vector prediction is enabled for an advanced motion vector prediction mode (AMVP) separately from data indicative of whether temporal motion vector prediction is enabled for merge mode.

16. A method for encoding video data, the method comprising:
- determining, for each reference picture in one or more reference picture lists for a current picture, whether to include the reference picture in a plurality of reference pictures for determining at least one motion vector predictor for a current block in the current picture, wherein the determination is based at least in part on whether the reference picture is a short-term reference picture or a long-term reference picture;
- determining, for at least one co-located block of the current block of video data in at least one picture of the plurality of reference pictures, whether a forward motion vector or a backward motion vector of the at least one co-located block of video data is used to derive the at least one motion vector predictor;
- determining the at least one motion vector predictor for the current block of the current picture based on the determination of whether the forward motion vector or the backward motion vector is used, one or more motion vectors of the at least one co-located block, and a comparison of a picture order count (POC) value of each picture of the plurality of reference pictures to a POC value of the current picture; and
- encoding a motion vector for the current block of video data relative to the at least one motion vector predictor.

17. The method of claim 16, wherein determining whether to include the reference picture comprises determining that the reference picture is not included in the plurality of reference pictures when the reference picture is a short-term reference picture.

18. The method of claim 16, wherein determining whether to include the reference picture comprises determining that the reference picture is not included in the plurality of reference pictures when the reference picture is a long-term reference picture.

19. The method of claim 16, wherein determining whether the forward motion vector or the backward motion vector is initially used comprises, when all reference pictures in the plurality of reference pictures have POC values that are smaller than or equal to the POC of the current picture, determining that the initially used motion vector of the co-located block is to have the same direction as the motion vector for the current block.

20. The method of claim 19, wherein the plurality of reference pictures is empty.

21. The method of claim 16, wherein determining whether the forward motion vector or the backward motion vector is initially used comprises, when at least one reference picture of the plurality of reference pictures has a POC value larger than the POC of the current picture, determining that the initially used motion vector of the co-located block has the same direction as signaled in a slice header for a slice including the current block, regardless of the direction of the motion vector for the current block.

22. The method of claim 16, wherein the long term reference pictures are one of inter-view reference pictures and inter-layer reference pictures.

23. The method of claim 16, wherein, when each of the reference pictures is a long term reference picture, determining the motion vector predictor comprises determining that the motion vector predictor corresponds to a motion vector of the co-located block that points into a reference picture list as indicated by a syntax element comprising data representative of the reference picture list.

24. The method of claim 23, wherein determining that the motion vector predictor comprises encoding a collocated_from_L0_flag, wherein the collocated_from_L0_flag identifies one of a first reference picture list comprising pictures occurring at an earlier time than the block and a second reference picture list comprising pictures occurring at a later time than the current block.

25. The method of claim 16, wherein, when each of the reference pictures is a long term reference picture, determining the at least one motion vector predictor comprises determining that the motion vector predictor corresponds to a motion vector of the co-located block that points into a reference picture list associated with the same temporal direction as a reference picture list into which the motion vector for the block points.

26. The method of claim 16, further comprising locating the at least one co-located block in a co-located picture, wherein the co-located picture is a short term reference picture and is the same for slices of video data of the picture that includes the block of video data.

27. The method of claim 16, further comprising locating the at least one co-located block in a co-located picture, wherein the co-located picture is long term reference picture and is the same for slices of video data of the picture that includes the block of video data.

28. The method of claim 16, further comprising locating the at least one co-located block in a co-located picture, wherein the current block of video data is included in picture a first view, and wherein the co-located picture is included in a second, different view and is the same for slices of video data of the picture that includes the block of video data.

29. The method of claim 16, further comprising marking a co-located picture that includes the at least one co-located block as a short term reference picture when a reference index of the co-located picture is equal to a reference index of a temporal motion vector predictor target picture and the co-located picture is included in the same view as the picture that includes the block of video data.

30. The method of claim 16, further comprising encoding data indicative of whether temporal motion vector prediction is enabled for an advanced motion vector prediction mode (AMVP) separately from data indicative of whether temporal motion vector prediction is enabled for merge mode.

31. A device for coding video data, the device comprising a video coder configured to determine, for each reference picture in one or more reference picture lists for a current picture, whether to include the reference picture in a plurality of reference pictures for determining at least one motion vector predictor for a current block in the current picture, wherein the determination is based at least in part on whether the reference picture is a short-term reference picture or a long-term reference picture, determine, for at least one co-located block of the current block of video data in at least one picture of the plurality of reference pictures, whether a forward motion vector or a backward motion vector of the at least one co-located block of video data is used to derive the at least one motion vector predictor, determine the at least one motion vector predictor for the current block of the current picture based on the determination of whether the forward motion vector or the backward motion vector is used, one or more motion vectors of the at least one co-located block, and a comparison of a picture order count (POC) value of each picture of the plurality of reference pictures to a POC value of the current picture, and code a motion vector for the current block of video data relative to the at least one motion vector predictor.

32. The device of claim 31, wherein the video coder is configured to determine that the reference picture is not included in the plurality of reference pictures when the reference picture is a short-term reference picture.

33. The device of claim 31, wherein the video coder is configured to determine that the reference picture is not included in the plurality of reference pictures when the reference picture is a long-term reference picture.

34. The device of claim 31, wherein the video coder is configured to determine, when all reference pictures in the plurality of reference pictures have POC values that are smaller than or equal to the POC of the current picture, that the initially used motion vector of the co-located block is to have the same direction as the motion vector for the current block.

35. The device of claim 34, wherein the plurality of reference pictures is empty.

36. The device of claim 31, wherein the video coder is configured to determine, when at least one reference picture of the plurality of reference pictures has a POC value larger than the POC of the current picture, that the initially used motion vector of the co-located block has the same direction as signaled in a slice header for a slice including the current block, regardless of the direction of the motion vector for the current block.

37. A device for coding video data, the device comprising:
means for determining, for each reference picture in one or more reference picture lists for a current picture, whether to include the reference picture in a plurality of reference pictures for determining at least one motion vector predictor for a current block in the current picture, wherein the determination is based at least in part on whether the reference picture is a short-term reference picture or a long-term reference picture;
means for determining, for at least one co-located block of the current block of video data in at least one picture of the plurality of reference pictures, whether a forward motion vector or a backward motion vector of the at least one co-located block of video data is used to derive the at least one motion vector predictor;
means for determining the at least one motion vector predictor for the current block of the current picture based on the determination of whether the forward motion vector or the backward motion vector is used, one or more motion vectors of the at least one co-located block, and a comparison of a picture order count (POC) value of each picture of the plurality of reference pictures to a POC value of the current picture; and
means for coding a motion vector for the current block of video data relative to the at least one motion vector predictor.

38. The device of claim 37, wherein the means for determining whether to include the reference picture comprises means for determining that the reference picture is not included in the plurality of reference pictures when the reference picture is a short-term reference picture.

39. The device of claim 37, wherein the means for determining whether to include the reference picture comprises means for determining that the reference picture is not included in the plurality of reference pictures when the reference picture is a long-term reference picture.

40. The device of claim 37, wherein the means for determining whether the forward motion vector or the backward motion vector is initially used comprises means for determining, when all reference pictures in the plurality of reference pictures have POC values that are smaller than or equal to the POC of the current picture, that the initially used motion vector of the co-located block is to have the same direction as the motion vector for the current block.

41. The device of claim 40, wherein the plurality of reference pictures is empty.

42. The device of claim 37, wherein the means for determining whether the forward motion vector or the backward motion vector is initially used comprises means for determining, when at least one reference picture of the plurality of reference pictures has a POC value larger than the POC of the current picture, that the initially used motion vector of the co-located block has the same direction as signaled in a slice header for a slice including the current block, regardless of the direction of the motion vector for the current block.

43. A non-transitory computer-readable storage medium having stored thereon instructions that, when executed, cause a processor of a device for coding video data to:
determine, for each reference picture in one or more reference picture lists for a current picture, whether to include the reference picture in a plurality of reference pictures for determining at least one motion vector predictor for a current block in the current picture, wherein the determination is based at least in part on whether the reference picture is a short-term reference picture or a long-term reference picture;
determine, for at least one co-located block of the current block of video data in at least one picture of the plurality of reference pictures, whether a forward motion vector or a backward motion vector of the at least one co-located block is used to derive the at least one motion vector predictor;
determine the at least one motion vector predictor for the current block of the current picture based on the determination of whether the forward motion vector or the backward motion vector is used, one or more motion vectors of the at least one co-located block, and a comparison of a picture order count (POC) value of each picture of the plurality of reference pictures to a POC value of the current picture; and
code a motion vector for the current block of video data relative to the at least one motion vector predictor.

44. The computer-readable storage medium of claim 43, wherein the instructions that cause the processor to determine whether to include the reference picture comprise instructions that cause the processor to determine that the reference picture is not included in the plurality of reference pictures when the reference picture is a short-term reference picture.

45. The computer-readable storage medium of claim 43, wherein the instructions that cause the processor to determine whether to include the reference picture comprise instructions that cause the processor to determine that the reference picture is not included in the plurality of reference pictures when the reference picture is a long-term reference picture.

46. The computer-readable storage medium of claim 43, wherein the instructions that cause the processor to determine whether the forward motion vector or the backward motion vector is initially used comprise instructions that cause the processor to, when all reference pictures in the plurality of reference pictures have POC values that are smaller than or equal to the POC of the current picture, determine that the initially used motion vector of the co-located block is to have the same direction as the motion vector for the current block.

47. The computer-readable storage medium of claim 46, wherein the plurality of reference pictures is empty.

48. The computer-readable storage medium of claim 43, wherein the instructions that cause the processor to determine whether the forward motion vector or the backward motion vector is initially used comprise instructions that cause the processor to, when at least one reference picture of the plurality of reference pictures has a POC value larger than the POC of the current picture, determine that the initially used motion vector of the co-located block has the same direction as signaled in a slice header for a slice including the current block, regardless of the direction of the motion vector for the current block.

* * * * *